(12) United States Patent
Loheide et al.

(10) Patent No.: US 12,707,104 B2
(45) Date of Patent: Aug. 11, 2026

(54) PUBLISHING DISPARATE LIVE MEDIA OUTPUT STREAMS IN MIXED MODE BASED ON USER SELECTION

(71) Applicant: Turner Broadcasting System, Inc., Atlanta, GA (US)

(72) Inventors: Donald Jude Loheide, Mableton, GA (US); Nishith Kumar Sinha, Mableton, GA (US); Nicolas Paul Webb, McDonough, GA (US)

(73) Assignee: Turner Broadcasting System, Inc., Atlanta, GA (US)

(*) Notice: Subject to any disclaimer, the term of this patent is extended or adjusted under 35 U.S.C. 154(b) by 0 days.

(21) Appl. No.: 18/433,662

(22) Filed: Feb. 6, 2024

(65) Prior Publication Data

US 2024/0179356 A1 May 30, 2024

Related U.S. Application Data

(63) Continuation of application No. 17/734,704, filed on May 2, 2022, now Pat. No. 11,917,217, which is a (Continued)

(51) Int. Cl.
*H04N 21/234* (2011.01)
*H04N 21/2187* (2011.01)
(Continued)

(52) U.S. Cl.
CPC ... *H04N 21/23424* (2013.01); *H04N 21/2187* (2013.01); *H04N 21/26283* (2013.01); *H04N 21/2668* (2013.01); *H04N 21/812* (2013.01)

(58) Field of Classification Search
CPC ......... H04N 21/23424; H04N 21/2187; H04N 21/26283; H04N 21/2668; H04N 21/812
See application file for complete search history.

(56) References Cited

U.S. PATENT DOCUMENTS 3,751,581 A 8/1973 Sakata et al.
4,500,930 A 2/1985 Hamalainen et al.
(Continued)

FOREIGN PATENT DOCUMENTS

AU 2015202846 A1 1/2016
KR 10-1061952 B1 9/2011
WO 2014/019063 A1 2/2014

OTHER PUBLICATIONS

Corrected Notice of Allowance for U.S. Appl. No. 16/229,497 dated Jun. 3, 2021.
(Continued)

*Primary Examiner* — Chenea Davis
(74) *Attorney, Agent, or Firm* — Alston & Bird LLP

(57) ABSTRACT

Disparate live output stream manifests are generated based on user selection. When current media programming content in an existing first disparate live media output stream is streamed on a media player, a processor determine a set of alternate live input streams and/or a pre-encoded media assets, and associated alternate live media output manifests and/or pre-encoded media asset manifests, respectively, based on parameters and metadata associated with the existing first disparate live media output stream. Based on an indicator in an existing first disparate live media output stream manifest, alternate content options are transmitted to the media player. A response is received corresponding to a selected alternate live input stream and/or a pre-encoded media asset. An updated first disparate live media output stream manifest is published to a content delivery system, which includes one of the alternate live input stream manifest associated with the selected alternate live input stream.

20 Claims, 9 Drawing Sheets

Related U.S. Application Data continuation of application No. 16/985,444, filed on Aug. 5, 2020, now Pat. No. 11,375,248, which is a continuation of application No. 16/236,673, filed on Dec. 31, 2018, now Pat. No. 10,856,016, which is a continuation-in-part of application No. 15/396,475, filed on Dec. 31, 2016, now Pat. No. 11,134,309.

(60) Provisional application No. 62/699,131, filed on Jul. 17, 2018.

(51) Int. Cl.
*H04N 21/262* (2011.01)
*H04N 21/2668* (2011.01)
*H04N 21/81* (2011.01)

(56) References Cited

U.S. PATENT DOCUMENTS 5,294,981 A 3/1994 Yazolino et al.
6,229,524 B1 5/2001 Chernock et al.
6,378,129 B1 4/2002 Zetts
6,434,621 B1 8/2002 Pezzillo et al.
6,625,811 B1 9/2003 Kaneko
6,701,355 B1 3/2004 Brandt et al.
6,727,914 B1 4/2004 Gutta
7,051,352 B1 5/2006 Schaffer
7,337,458 B2 2/2008 Michelitsch et al.
7,380,262 B2 5/2008 Wang et al.
7,581,237 B1 8/2009 Kurapati
7,610,597 B1 10/2009 Johnson et al.
7,840,980 B2 11/2010 Gutta
7,985,134 B2 7/2011 Ellis
8,005,826 B1 8/2011 Sahami et al.
8,099,757 B2 1/2012 Riedl et al.
8,132,203 B2 3/2012 De Heer
8,234,350 B1 7/2012 Gu et al.
8,455,803 B2 6/2013 Danzer et al.
8,458,053 B1 6/2013 Buron et al.
8,533,761 B1 9/2013 Sahami et al.
8,553,853 B2 10/2013 Middleswarth et al.
8,572,649 B1 10/2013 Gossweiler et al.
8,578,042 B2 11/2013 Hu et al.
8,600,382 B2 12/2013 Hicks, III
8,631,440 B2 1/2014 Gossweiler et al.
8,819,726 B2 8/2014 Wetzer et al.
8,826,443 B1 9/2014 Raman et al.
8,842,879 B2 9/2014 Laksono et al.
8,843,965 B1 9/2014 Kurapati et al.
8,954,521 B1 2/2015 Faaborg et al.
9,094,639 B2 7/2015 Yim et al.
9,130,918 B2 9/2015 Picconi et al.
9,342,668 B2 5/2016 Wang et al.
9,380,264 B1 6/2016 Vakalapudi
9,390,447 B1 7/2016 Smith
9,959,349 B1 5/2018 Nijim et al.
10,045,091 B1 8/2018 Nijim et al.
10,075,753 B2 9/2018 Loheide et al.
10,148,716 B1 12/2018 Joseph et al.
10,194,177 B1 * 1/2019 Ashbacher ........... H04N 21/812
10,586,016 B2 3/2020 Dominick et al.
10,771,824 B1 9/2020 Haritaoglu et al.
10,856,016 B2 12/2020 Loheide et al.
10,924,804 B2 2/2021 Loheide et al.
10,965,967 B2 3/2021 Loheide et al.
10,992,973 B2 4/2021 Loheide et al.
11,051,061 B2 6/2021 Loheide et al.
11,051,074 B2 6/2021 Loheide et al.
11,109,086 B2 8/2021 Loheide et al.
11,109,102 B2 8/2021 Loheide et al.
11,134,309 B2 9/2021 Loheide et al.
11,438,658 B2 9/2022 Loheide et al.
11,451,872 B1 9/2022 Spencer et al.
11,470,373 B2 10/2022 Loheide et al.
11,477,254 B2 10/2022 Loheide et al.
11,483,596 B2 10/2022 Loheide et al.
11,503,349 B2 11/2022 Loheide et al.
11,546,400 B2 1/2023 Loheide et al.
11,611,804 B2 3/2023 Loheide et al.
11,622,143 B2 4/2023 Loheide et al.
11,665,398 B2 5/2023 Loheide et al.
11,671,641 B2 6/2023 Loheide et al.
2002/0038457 A1 3/2002 Numata et al.
2002/0112239 A1 8/2002 Goldman
2002/0178447 A1 11/2002 Plotnick et al.
2003/0023757 A1 1/2003 Ishioka et al.
2003/0026628 A1 2/2003 Arimoto
2003/0051239 A1 3/2003 Hudspeth
2003/0110507 A1 6/2003 Dimitrova et al.
2003/0126600 A1 7/2003 Heuvelman
2003/0151538 A1 8/2003 Escobosa et al.
2003/0182658 A1 9/2003 Alexander
2003/0212708 A1 11/2003 Potrebic et al.
2003/0236832 A1 12/2003 McIntyre et al.
2004/0022278 A1 2/2004 Thomas et al.
2004/0031056 A1 2/2004 Wolff
2004/0128682 A1 7/2004 Liga et al.
2004/0163103 A1 8/2004 Swix et al.
2004/0172650 A1 9/2004 Hawkins et al.
2004/0172662 A1 9/2004 Danker et al.
2005/0015816 A1 1/2005 Christofalo et al.
2005/0060745 A1 3/2005 Riedl et al.
2005/0096978 A1 5/2005 Black
2005/0120369 A1 6/2005 Matz
2005/0132401 A1 6/2005 Boccon-Gibod et al.
2005/0135613 A1 6/2005 Brandenburg et al.
2006/0031889 A1 2/2006 Bennett et al.
2006/0064730 A1 3/2006 Rael et al.
2006/0122916 A1 6/2006 Kassan
2006/0287915 A1 12/2006 Boulet et al.
2007/0011718 A1 1/2007 Nee, Jr.
2007/0033419 A1 2/2007 Kocher et al.
2007/0101361 A1 5/2007 Spielman et al.
2007/0186228 A1 8/2007 Ramaswamy et al.
2007/0238035 A1 10/2007 Holscher et al.
2007/0250901 A1 10/2007 McIntire et al.
2008/0086742 A1 4/2008 Aldrey et al.
2008/0163304 A1 7/2008 Ellis
2008/0201735 A1 8/2008 Sumiyoshi et al.
2008/0263578 A1 10/2008 Bayer et al.
2008/0271078 A1 10/2008 Gossweiler et al.
2008/0271080 A1 10/2008 Gossweiler et al.
2008/0320513 A1 12/2008 Wong et al.
2009/0049469 A1 2/2009 Small et al.
2009/0070808 A1 3/2009 Jacobs
2009/0070819 A1 3/2009 Gajda et al.
2009/0083810 A1 3/2009 Hattori et al.
2009/0100452 A1 4/2009 Hudgeons et al.
2009/0187939 A1 7/2009 Lajoie
2009/0254934 A1 10/2009 Grammens
2009/0256972 A1 10/2009 Ramaswamy et al.
2009/0285217 A1 11/2009 Frink et al.
2009/0287790 A1 11/2009 Upton et al.
2010/0010899 A1 1/2010 Lambert et al.
2010/0125880 A1 5/2010 Roewe
2010/0146548 A1 6/2010 Yim et al.
2010/0146559 A1 6/2010 Lee et al.
2010/0169914 A1 7/2010 Williamson et al.
2010/0287297 A1 11/2010 Lefebvre
2010/0293585 A1 11/2010 Xia
2010/0325655 A1 12/2010 Perez
2010/0325657 A1 12/2010 Sellers et al.
2011/0022471 A1 1/2011 Brueck et al.
2011/0052144 A1 3/2011 Abbas et al.
2011/0123062 A1 5/2011 Hilu
2011/0153464 A1 6/2011 Hendricks et al.
2011/0161500 A1 6/2011 Yengalasetti et al.
2011/0164115 A1 7/2011 Bennett et al.
2011/0177775 A1 7/2011 Gupta et al.
2011/0209181 A1 8/2011 Gupta et al.
2011/0238754 A1 9/2011 Dasilva et al.
2011/0246202 A1 10/2011 Mcmillan et al.
2011/0302601 A1 12/2011 Mayo et al.
2011/0321088 A1 12/2011 Jacobs et al.

(56) References Cited

U.S. PATENT DOCUMENTS

2012/0017282 A1 1/2012 Kang et al.
2012/0030011 A1 2/2012 Rey et al.
2012/0047542 A1 2/2012 Lewis et al.
2012/0110621 A1 5/2012 Gossweiler, III
2012/0143693 A1 6/2012 Chung et al.
2012/0192232 A1 7/2012 Ellis
2012/0271942 A1 10/2012 Walker et al.
2012/0272264 A1 10/2012 Suzuki et al.
2012/0272278 A1 10/2012 Bedi
2012/0284737 A1 11/2012 Savoor et al.
2012/0304223 A1 11/2012 Sargent et al.
2013/0085851 A1 4/2013 Pedro et al.
2013/0121487 A1 5/2013 Lorberbaum et al.
2013/0160051 A1 6/2013 Armstrong et al.
2013/0198328 A1 8/2013 Green et al.
2013/0205212 A1 8/2013 Sinha et al.
2013/0208811 A1 8/2013 Liu et al.
2013/0227283 A1 8/2013 Williamson et al.
2013/0227284 A1 8/2013 Pfeffer et al.
2013/0263168 A1 10/2013 Choi
2013/0263182 A1 10/2013 Ivy et al.
2013/0276023 A1 10/2013 Kent et al.
2013/0305287 A1 11/2013 Wong et al.
2013/0312041 A1 11/2013 Gresta
2013/0325605 A1 12/2013 Callaghan et al.
2014/0013354 A1 1/2014 Johnson et al.
2014/0020017 A1 1/2014 Stern et al.
2014/0032259 A1 1/2014 Lafever et al.
2014/0033240 A1 1/2014 Card, II
2014/0071818 A1 3/2014 Wang et al.
2014/0143806 A1 5/2014 Steinberg et al.
2014/0150019 A1 5/2014 Ma et al.
2014/0152894 A1 6/2014 Childs et al.
2014/0157312 A1 6/2014 Williams et al.
2014/0173666 A1 6/2014 Gordon et al.
2014/0186001 A1 7/2014 Aldrey et al.
2014/0189514 A1 7/2014 Hilliard
2014/0189743 A1 7/2014 Kennedy et al.
2014/0189754 A1 7/2014 Major et al.
2014/0230003 A1 8/2014 Ma et al.
2014/0237243 A1 8/2014 Ma et al.
2014/0270338 A1 9/2014 Zhao et al.
2014/0280781 A1 9/2014 Gregotski
2014/0282723 A1 9/2014 Sinha et al.
2014/0310745 A1 10/2014 Canney et al.
2014/0317666 A1 10/2014 Chiarulli et al.
2014/0351843 A1 11/2014 Theriault
2014/0359656 A1 12/2014 Banica et al.
2014/0366068 A1 12/2014 Burkitt et al.
2015/0012926 A1 1/2015 Wei et al.
2015/0033255 A1 1/2015 Neumann et al.
2015/0058874 A1 2/2015 Sun et al.
2015/0074732 A1 3/2015 Green et al.
2015/0106856 A1 4/2015 Rankine
2015/0127845 A1 5/2015 Phillips et al.
2015/0215359 A1* 7/2015 Bao .......................... H04L 65/80 709/219
2015/0237386 A1 8/2015 Sheehan et al.
2015/0237389 A1 8/2015 Grouf et al.
2015/0249865 A1 9/2015 Oliveira
2015/0256861 A1 9/2015 Oyman
2015/0271234 A1* 9/2015 O'Malley ............. H04L 65/765 709/219
2015/0289022 A1 10/2015 Gross
2015/0381936 A1 12/2015 Goyal et al.
2015/0382042 A1 12/2015 Wagenaar et al.
2015/0382047 A1 12/2015 Van et al.
2015/0382274 A1 12/2015 Logvinov et al.
2016/0029055 A1 1/2016 Villegas et al.
2016/0063530 A1 3/2016 Lin
2016/0073155 A1 3/2016 Subramaniam et al.
2016/0077710 A1 3/2016 Lewis et al.
2016/0105477 A1 4/2016 Holden et al.
2016/0112740 A1 4/2016 Francisco et al.
2016/0127786 A1 5/2016 Langer
2016/0127788 A1 5/2016 Roberts et al.
2016/0142783 A1 5/2016 Bagga et al.
2016/0150290 A1 5/2016 Chandler et al.
2016/0165306 A1 6/2016 Nam
2016/0182923 A1 6/2016 Higgs et al.
2016/0182954 A1 6/2016 Nguyen et al.
2016/0198202 A1 7/2016 Van et al.
2016/0227260 A1 8/2016 Hundemer et al.
2016/0255391 A1 9/2016 Noble
2016/0308958 A1 10/2016 Navali et al.
2016/0316247 A1 10/2016 Biagini et al.
2016/0337680 A1 11/2016 Kalagi et al.
2016/0337704 A1 11/2016 Binder et al.
2016/0345074 A1 11/2016 Serbest et al.
2016/0366202 A1 12/2016 Phillips et al.
2017/0019453 A1 1/2017 Panje
2017/0041656 A1* 2/2017 Bieschke ........... H04N 21/4828
2017/0055012 A1 2/2017 Phillips et al.
2017/0055041 A1 2/2017 Zhu
2017/0064400 A1 3/2017 Riegel et al.
2017/0070789 A1 3/2017 Liassides et al.
2017/0085935 A1 3/2017 Riedel et al.
2017/0099506 A1 4/2017 Grover
2017/0099511 A1 4/2017 Grover
2017/0099525 A1 4/2017 Ray et al.
2017/0111418 A1* 4/2017 Warren ................... H04L 67/02
2017/0118537 A1 4/2017 Stransky-Heilkron et al.
2017/0118538 A1 4/2017 Ashbacher
2017/0164019 A1 6/2017 Oh et al.
2017/0171610 A1 6/2017 Nair et al.
2017/0193544 A1 7/2017 Glasgow et al.
2017/0195718 A1 7/2017 Nair et al.
2017/0201779 A1 7/2017 Publicover et al.
2017/0238035 A1 8/2017 Perez
2017/0257446 A1 9/2017 Bevilacqua et al.
2017/0289597 A1 10/2017 Riedel et al.
2017/0295386 A1 10/2017 Owen et al.
2017/0308681 A1 10/2017 Gould et al.
2017/0310752 A1 10/2017 Knothe
2017/0332114 A1 11/2017 Turgut et al.
2018/0007060 A1 1/2018 Leblang et al.
2018/0035136 A1 2/2018 Crowe
2018/0048599 A1 2/2018 Arghandiwal et al.
2018/0131986 A1 5/2018 Cole et al.
2018/0160159 A1 6/2018 Asarikuniyil
2018/0165650 A1 6/2018 Kashyape et al.
2018/0184047 A1 6/2018 Simonsen et al.
2018/0285747 A1 10/2018 Bron et al.
2018/0300751 A1 10/2018 Hammitt et al.
2018/0343505 A1 11/2018 Loheide et al.
2018/0367823 A1 12/2018 Brinkley et al.
2019/0068665 A1 2/2019 Kieft et al.
2019/0075148 A1 3/2019 Nielsen et al.
2019/0364317 A1 11/2019 Milford
2019/0380021 A1 12/2019 Meek et al.
2020/0059308 A1 2/2020 Cox et al.
2020/0244778 A1 7/2020 Berookhim et al.
2021/0297740 A1 9/2021 Loheide et al.
2022/0272411 A1 8/2022 Loheide et al.
2023/0014831 A1 1/2023 Marten
2024/0348879 A1 10/2024 Loheide et al.

OTHER PUBLICATIONS

Corrected Notice of Allowance for U.S. Appl. No. 16/229,614 dated Jun. 29, 2021.

Corrected Notice of Allowance for U.S. Appl. No. 16/230,268 dated Dec. 2, 2020.

Corrected Notice of Allowance for U.S. Appl. No. 16/231,467 dated Nov. 20, 2020.

Corrected Notice of Allowance for U.S. Appl. No. 16/234,870 dated Feb. 24, 2021.

Corrected Notice of Allowance for U.S. Appl. No. 16/234,870 dated Jan. 15, 2021.

Corrected Notice of Allowance for U.S. Appl. No. 16/235,445 dated Mar. 26, 2021.

Corrected Notice of Allowance for U.S. Appl. No. 16/236,673 dated Oct. 23, 2020.

(56) References Cited

OTHER PUBLICATIONS

Corrected Notice of Allowance for U.S. Appl. No. 16/236,673 dated Sep. 21, 2020.
Corrected Notice of Allowance for U.S. Appl. No. 16/236,713 dated Apr. 8, 2021.
Corrected Notice of Allowance for U.S. Appl. No. 16/236,713 dated May 17, 2021.
Corrected Notice of Allowance for U.S. Appl. No. 16/854,970 dated Jan. 23, 2023.
Corrected Notice of Allowance for U.S. Appl. No. 16/854,970 dated Jan. 5, 2023.
Corrected Notice of Allowance for U.S. Appl. No. 16/895,439 dated Sep. 14, 2022.
Corrected Notice of Allowance for U.S. Appl. No. 16/902,775 dated Apr. 26, 2021.
Corrected Notice of Allowance for U.S. Appl. No. 16/902,775 dated Apr. 9, 2021.
Corrected Notice of Allowance for U.S. Appl. No. 16/902,775 dated Jul. 30, 2021.
Corrected Notice of Allowance for U.S. Appl. No. 16/902,775 dated Jun. 11, 2021.
Corrected Notice of Allowance for U.S. Appl. No. 16/902,893 dated Sep. 19, 2022.
Corrected Notice of Allowance for U.S. Appl. No. 16/985,444 dated Apr. 20, 2022.
Corrected Notice of Allowance for U.S. Appl. No. 16/985,444 dated Jun. 1, 2022.
Corrected Notice of Allowance for U.S. Appl. No. 16/985,444 dated Mar. 25, 2022.
Corrected Notice of Allowance for U.S. Appl. No. 17/016,789 dated Jun. 27, 2022.
Corrected Notice of Allowance for U.S. Appl. No. 17/016,789 dated May 18, 2022.
Corrected Notice of Allowance for U.S. Appl. No. 17/017,052 dated Aug. 1, 2022.
Corrected Notice of Allowance for U.S. Appl. No. 17/017,052 dated Jun. 15, 2022.
Corrected Notice of Allowance for U.S. Appl. No. 17/017,145 dated Jul. 22, 2022.
Corrected Notice of Allowance for U.S. Appl. No. 17/017,145 dated Jun. 2, 2022.
Corrected Notice of Allowance for U.S. Appl. No. 17/017,145 dated Mar. 4, 2022.
Corrected Notice of Allowance for U.S. Appl. No. 17/017,145 dated May 17, 2022.
Corrected Notice of Allowance for U.S. Appl. No. 17/017,145 dated Sep. 15, 2022.
Corrected Notice of Allowance for U.S. Appl. No. 17/017,241 dated Aug. 3, 2022.
Corrected Notice of Allowance for U.S. Appl. No. 17/017,241 dated Dec. 2, 2022.
Corrected Notice of Allowance for U.S. Appl. No. 17/017,241 dated Oct. 20, 2022.
Corrected Notice of Allowance for U.S. Appl. No. 17/038,323 dated Apr. 19, 2022.
Corrected Notice of Allowance for U.S. Appl. No. 17/038,323 dated Feb. 2, 2022.
Corrected Notice of Allowance for U.S. Appl. No. 17/038,323 dated May 26, 2022.
Corrected Notice of Allowance for U.S. Appl. No. 17/094,102 dated Apr. 20, 2022.
Corrected Notice of Allowance for U.S. Appl. No. 17/094,102 dated Aug. 3, 2022.
Corrected Notice of Allowance for U.S. Appl. No. 17/094,102 dated Jun. 24, 2022.
Corrected Notice of Allowance for U.S. Appl. No. 17/094,102 dated Mar. 10, 2022.
Corrected Notice of Allowance for U.S. Appl. No. 17/094,102 dated May 17, 2022.
Corrected Notice of Allowance for U.S. Appl. No. 17/094,319 dated Aug. 1, 2022.
Corrected Notice of Allowance for U.S. Appl. No. 17/094,319 dated Jun. 15, 2022.
Corrected Notice of Allowance for U.S. Appl. No. 17/094,319 dated May 17, 2022.
Corrected Notice of Allowance for U.S. Appl. No. 17/094,319 dated Sep. 23, 2022.
Corrected Notice of Allowance for U.S. Appl. No. 17/147,887 dated Jul. 22, 2022.
Corrected Notice of Allowance for U.S. Appl. No. 17/147,887 dated May 18, 2022.
Corrected Notice of Allowance for U.S. Appl. No. 17/147,887 dated Oct. 11, 2022.
Corrected Notice of Allowance for U.S. Appl. No. 17/306,758 dated Dec. 21, 2022.
Non-Final Office Action in U.S. Appl. No. 15/396,475 dated Nov. 30, 2018.
Non-Final Office Action in U.S. Appl. No. 15/396,614 dated Mar. 7, 2019.
Non-Final Office Action in U.S. Appl. No. 15/396,614 dated May 18, 2018.
Non-Final Office Action in U.S. Appl. No. 15/396,624 dated Jul. 13, 2018.
Non-Final Office Action in U.S. Appl. No. 15/986,218 dated Nov. 28, 2018.
Non-Final Office Acton for U.S. Appl. No. 17/016,789 dated Dec. 21, 2021.
Non-Final Rejection Mailed on Aug. 6, 2020 for U.S. Appl. No. 15/396,475, 14 page(s).
Non-Final Rejection Mailed on Dec. 7, 2023 for U.S. Appl. No. 17/875,775, 9 page(s).
Non-Final Rejection Mailed on Dec. 20, 2023 for U.S. Appl. No. 18/319,898, 10 page(s).
Non-Final Rejection Mailed on Dec. 21, 2021 for U.S. Appl. No. 17/016,789, 7 page(s).
Non-Final Rejection Mailed on Dec. 22, 2022 for U.S. Appl. No. 17/206,473, 8 page(s).
Non-Final Rejection Mailed on Jan. 10, 2020 for U.S. Appl. No. 16/236,673, 5 page(s).
NonFinal Office Action for U.S. Appl. No. 17/875,775, dated Dec. 7, 2023, (9 pages), United States Patent and Trademark Office, US.
Notice of Allowability for U.S. Appl. No. 15/986,241 dated Aug. 18, 2020.
Notice of Allowability for U.S. Appl. No. 15/986,218 dated Jul. 13, 2020.
Notice of Allowability for U.S. Appl. No. 15/986,361 dated Aug. 18, 2020.
Notice of Allowability for U.S. Appl. No. 15/986,361 dated Jul. 14, 2020.
Notice of Allowability for U.S. Appl. No. 15/986,361 dated May 15, 2020.
Notice of Allowability for U.S. Appl. No. 15/986,361 dated Sep. 30, 2020.
Notice of Allowability for U.S. Appl. No. 16/092,893 dated Jun. 8, 2022.
Notice of Allowability for U.S. Appl. No. 16/895,439 dated Jul. 20, 2022.
Notice of Allowability for U.S. Appl. No. 16/895,439 dated Jun. 8, 2022.
Notice of Allowability for U.S. Appl. No. 16/895,439 dated May 16, 2022.
Notice of Allowability for U.S. Appl. No. 16/902,893 dated Jul. 20, 2022.
Notice of Allowability for U.S. Appl. No. 16/902,893 dated May 13, 2022.
Notice of Allowability for U.S. Appl. No. 16/918,085 dated Mar. 1, 2023.
Notice of Allowability for U.S. Appl. No. 17/839,649 dated Jan. 25, 2023.
Notice of Allowance and Fees Due (PTOL-85) Mailed on Aug. 21, 2023 for U.S. Appl. No. 17/739,885, 8 page(s).

(56) References Cited

OTHER PUBLICATIONS

Notice of Allowance and Fees Due (PTOL-85) Mailed on Feb. 15, 2023 for U.S. Appl. No. 17/340,538, 6 page(s).
Notice of Allowance and Fees Due (PTOL-85) Mailed on Jan. 4, 2024 for U.S. Appl. No. 18/147,421, 8 page(s).
Notice of Allowance and Fees Due (PTOL-85) Mailed on Jan. 12, 2024 for U.S. Appl. No. 18/147,421, 2 page(s).
Notice of Allowance and Fees Due (PTOL-85) Mailed on Jul. 12, 2021 for U.S. Appl. No. 15/396,475, 2 page(s).
Notice of Allowance and Fees Due (PTOL-85) Mailed on Jul. 22, 2022 for U.S. Appl. No. 17/147,887, 9 page(s).
Notice of Allowance and Fees Due (PTOL-85) Mailed on Jun. 2, 2022 for U.S. Appl. No. 17/017,145, 2 page(s).
Notice of Allowance and Fees Due (PTOL-85) Mailed on Mar. 9, 2023 for U.S. Appl. No. 17/326,281, 2 page(s).
Notice of Allowance and Fees Due (PTOL-85) Mailed on Oct. 18, 2023 for U.S. Appl. No. 17/734,704, 8 page(s).
Notice of Allowance and Fees Due (PTOL-85) Mailed on Sep. 16, 2022 for U.S. Appl. No. 17/306,758, 13 page(s).
Notice of Allowance for U.S. Appl. No. 15/396,468 dated Mar. 18, 2022.
Notice of Allowance for U.S. Appl. No. 15/396,475 dated Feb. 5, 2021.
Notice of Allowance for U.S. Appl. No. 15/396,624 dated May 31, 2019.
Notice of Allowance for U.S. Appl. No. 15/986,361 dated Apr. 8, 2020.
Notice of Allowance for U.S. Appl. No. 15/986,406 dated Mar. 3, 2021.
Notice of Allowance for U.S. Appl. No. 15/986,451 dated May 5, 2021.
Notice of Allowance for U.S. Appl. No. 15/988,241 dated Aug. 26, 2020.
Notice of Allowance for U.S. Appl. No. 15/988,241 dated Mar. 18, 2020.
Notice of Allowance for U.S. Appl. No. 15/988,308 dated Jul. 30, 2021.
Notice of Allowance for U.S. Appl. No. 15/988,492 dated Jul. 30, 2021.
Notice of Allowance for U.S. Appl. No. 16/128,104 dated Dec. 12, 2019.
Notice of Allowance for U.S. Appl. No. 16/229,310 dated Dec. 14, 2020.
Notice of Allowance for U.S. Appl. No. 16/229,497 dated Dec. 30, 2020.
Notice of Allowance for U.S. Appl. No. 16/229,614 dated Feb. 18, 2021.
Notice of Allowance for U.S. Appl. No. 16/230,268 dated Aug. 24, 2020.
Notice of Allowance for U.S. Appl. No. 16/230,493 dated Feb. 12, 2021.
Notice of Allowance for U.S. Appl. No. 16/231,467 dated Apr. 16, 2020.
Notice of Allowance for U.S. Appl. No. 16/234,870 dated Aug. 19, 2020.
Notice of Allowance for U.S. Appl. No. 16/235,445 dated Nov. 4, 2020.
Notice of Allowance for U.S. Appl. No. 16/236,713 dated Nov. 18, 2020.
Notice of Allowance for U.S. Appl. No. 16/299,310 dated Dec. 14, 2020.
Notice of Allowance for U.S. Appl. No. 16/854,970 dated Oct. 13, 2022.
Notice of Allowance for U.S. Appl. No. 16/895,439 dated Mar. 1, 2022.
Notice of Allowance for U.S. Appl. No. 16/902,775 dated Feb. 2, 2021.
Notice of Allowance for U.S. Appl. No. 16/902,893 dated Feb. 25, 2022.
Notice of Allowance for U.S. Appl. No. 16/918,085 dated Jan. 13, 2023.
Notice of Allowance for U.S. Appl. No. 16/985,444 dated Jan. 10, 2022.
Notice of Allowance for U.S. Appl. No. 17/016,789 dated Feb. 11, 2022.
Notice of Allowance for U.S. Appl. No. 17/017,052 dated Feb. 11, 2022.
Notice of Allowance for U.S. Appl. No. 17/017,145 dated Feb. 16, 2022.
Notice of Allowance for U.S. Appl. No. 17/017,241 dated Jul. 15, 2022.
Notice of Allowance for U.S. Appl. No. 17/038,323 dated Jan. 12, 2022.
Notice of Allowance for U.S. Appl. No. 17/094,102 dated Jan. 14, 2022.
Notice of Allowance for U.S. Appl. No. 17/094,319 dated Apr. 12, 2022.
Notice of Allowance for U.S. Appl. No. 17/147,887 dated Apr. 19, 2022.
Notice of Allowance for U.S. Appl. No. 17/206,473 dated Mar. 30, 2023.
Notice of Allowance for U.S. Appl. No. 17/306,758 dated Sep. 16, 2022.
Notice of Allowance for U.S. Appl. No. 17/326,258 dated Apr. 27, 2022.
Notice of Allowance for U.S. Appl. No. 17/326,258 dated Nov. 17, 2021.
Notice of Allowance for U.S. Appl. No. 17/326,281 dated Dec. 7, 2022.
Notice of Allowance for U.S. Appl. No. 17/340,166 dated Mar. 21, 2022.
Notice of Allowance for U.S. Appl. No. 17/340,538 dated Jan. 23, 2023.
Notice of Allowance for U.S. Appl. No. 17/340,677 dated Aug. 8, 2022.
Notice of Allowance for U.S. Appl. No. 17/453,628 dated Mar. 2, 2023.
Notice of Allowance for U.S. Appl. No. 17/527,817 dated Oct. 3, 2022.
Notice of Allowance for U.S. Appl. No. 17/688,666 dated Sep. 20, 2022.
Notice of Allowance for U.S. Appl. No. 17/708,241 dated Apr. 5, 2023.
Notice of Allowance for U.S. Appl. No. 17/731,049 dated Mar. 2, 2023.
Notice of Allowance for U.S. Appl. No. 17/830,587 dated Mar. 9, 2023.
Notice of Allowance for U.S. Appl. No. 17/830,788 dated Dec. 9, 2022.
Notice of Allowance for U.S. Appl. No. 17/839,649 dated Oct. 19, 2022.
Notice of Allowance for U.S. Appl. No. 17/839,882 dated Oct. 26, 2022.
Notice of Allowance for U.S. Appl. No. 17/858,698 dated Oct. 4, 2022.
Notice of Allowance for U.S. Appl. No. 17/986,403 dated Apr. 7, 2023.
Notice of Allowance for U.S. Appl. No. 18/158,202 dated May 25, 2023.
Notice of Allowance for U.S. Appl. No. 18/160,833 dated Jun. 14, 2023.
Notice of Allowance for U.S. Appl. No. 17/408,680 dated Jul. 20, 2023.
Notice of Allowance for U.S. Appl. No. 17/408,739 dated Jul. 5, 2023.
Notice of Allowance for U.S. Appl. No. 17/742,468 dated Aug. 15, 2023.
Notice of Allowance for U.S. Appl. No. 18/149,332 dated Aug. 11, 2023.
Notice of Allowance for U.S. Appl. No. 18/157,294 dated Jul. 11, 2023.

(56) References Cited

OTHER PUBLICATIONS

Notice of Allowance for U.S. Appl. No. 18/161,957 dated Jul. 11, 2023.
Corrected Notice of Allowance for U.S. Appl. No. 17/306,758 dated Feb. 15, 2023.
Corrected Notice of Allowance for U.S. Appl. No. 17/306,758 dated Jan. 5, 2023.
Corrected Notice of Allowance for U.S. Appl. No. 17/326,258 dated Apr. 19, 2022.
Corrected Notice of Allowance for U.S. Appl. No. 17/326,258 dated Dec. 22, 2021.
Corrected Notice of Allowance for U.S. Appl. No. 17/326,258 dated Feb. 25, 2022.
Corrected Notice of Allowance for U.S. Appl. No. 17/326,258 dated Mar. 14, 2022.
Corrected Notice of Allowance for U.S. Appl. No. 17/326,258 dated Mar. 2, 2022.
Corrected Notice of Allowance for U.S. Appl. No. 17/326,281 dated Dec. 22, 2022.
Corrected Notice of Allowance for U.S. Appl. No. 17/340,166 dated Aug. 22, 2022.
Corrected Notice of Allowance for U.S. Appl. No. 17/340,166 dated Jul. 5, 2022.
Corrected Notice of Allowance for U.S. Appl. No. 17/340,166 dated Jun. 2, 2022.
Corrected Notice of Allowance for U.S. Appl. No. 17/340,166 dated Sep. 23, 2022.
Corrected Notice of Allowance for U.S. Appl. No. 17/340,256 dated Feb. 13, 2023.
Corrected Notice of Allowance for U.S. Appl. No. 17/340,256 dated Jan. 6, 2023.
Corrected Notice of Allowance for U.S. Appl. No. 17/340,538 dated Feb. 15, 2023.
Corrected Notice of Allowance for U.S. Appl. No. 17/340,677 dated Dec. 9, 2022.
Corrected Notice of Allowance for U.S. Appl. No. 17/340,677 dated Nov. 14, 2022.
Corrected Notice of Allowance for U.S. Appl. No. 17/340,677 dated Oct. 21, 2022.
Corrected Notice of Allowance for U.S. Appl. No. 17/688,666 dated Dec. 14, 2022.
Corrected Notice of Allowance for U.S. Appl. No. 17/688,666 dated Dec. 28, 2022.
Corrected Notice of Allowance for U.S. Appl. No. 17/688,666 dated Feb. 10, 2023.
Corrected Notice of Allowance for U.S. Appl. No. 17/839,882 dated Dec. 23, 2022.
Corrected Notice of Allowance for U.S. Appl. No. 17/858,698 dated Dec. 28, 2022.
Corrected Notice of Allowance for U.S. Appl. No. 17/858,698 dated Jan. 12, 2023.
Corrected Notice of Allowance in U.S. Appl. No. 15/396,453 dated Jun. 13, 2019.
Corrected Notice of Allowance in U.S. Appl. No. 15/396,462 dated Aug. 8, 2018.
Corrected Notice of Allowance in U.S. Appl. No. 15/396,462 dated Jul. 11, 2018.
Examiner Interview Summary Record (PTOL-413) Mailed on Aug. 18, 2023 for U.S. Appl. No. 17/206,737, 2 page(s).
Final Office Action for U.S. Appl. No. 15/396,468 dated Dec. 2, 2021.
Final Office Action for U.S. Appl. No. 15/396,468 dated Feb. 10, 2021.
Final Office Action for U.S. Appl. No. 15/396,468 dated Nov. 6, 2019.
Final Office Action for U.S. Appl. No. 15/396,475 dated Feb. 4, 2020.
Final Office Action for U.S. Appl. No. 15/396,614 dated Aug. 12, 2019.
Final Office Action for U.S. Appl. No. 15/986,218 dated Apr. 24, 2019.
Final Office Action for U.S. Appl. No. 15/986,218 dated Jan. 31, 2020.
Final Office Action for U.S. Appl. No. 15/986,286 dated Jun. 9, 2020.
Final Office Action for U.S. Appl. No. 15/986,361 dated Dec. 23, 2019.
Final Office Action for U.S. Appl. No. 15/986,406 dated May 26, 2020.
Final Office Action for U.S. Appl. No. 15/986,451 dated Dec. 16, 2019.
Final Office Action for U.S. Appl. No. 15/986,451 dated Sep. 29, 2020.
Final Office Action for U.S. Appl. No. 15/988,241 dated Jan. 8, 2020.
Final Office Action for U.S. Appl. No. 15/988,308 dated Jan. 28, 2021.
Final Office Action for U.S. Appl. No. 15/988,308 dated May 6, 2020.
Final Office Action for U.S. Appl. No. 15/988,308 dated May 9, 2019.
Final Office Action for U.S. Appl. No. 15/988,492 dated Jan. 6, 2021.
Final Office Action for U.S. Appl. No. 15/988,492 dated May 28, 2020.
Final Office Action for U.S. Appl. No. 15/988,572 dated Apr. 11, 2023.
Final Office Action for U.S. Appl. No. 15/988,572 dated Jul. 2, 2020.
Final Office Action for U.S. Appl. No. 15/988,572 dated Mar. 10, 2022.
Final Office Action for U.S. Appl. No. 16/229,310 dated Jun. 11, 2020.
Advisory Action (PTOL-303) Mailed on Nov. 28, 2022 for U.S. Appl. No. 17/206,473, 3 page(s).
Advisory Action (PTOL-303) Mailed on Sep. 30, 2020 for U.S. Appl. No. 16/229,614, 3 page(s).
Advisory Action for U.S. Appl. No. 15/396,468 dated Jan. 16, 2020.
Advisory Action for U.S. Appl. No. 15/396,475 dated Jun. 3, 2019.
Advisory Action for U.S. Appl. No. 15/396,475 dated May 13, 2020.
Advisory Action for U.S. Appl. No. 15/396,614 dated Oct. 24, 2019.
Advisory Action for U.S. Appl. No. 15/986,218 dated Jul. 12, 2019.
Advisory Action for U.S. Appl. No. 15/986,361 dated Feb. 26, 2020.
Advisory Action for U.S. Appl. No. 15/986,451 dated Feb. 20, 2020.
Advisory Action for U.S. Appl. No. 15/988,308 dated Jul. 16, 2019.
Advisory Action for U.S. Appl. No. 17/408,680 dated Mar. 28, 2023.
Advisory Action for U.S. Appl. No. 17/408,739 dated Mar. 28, 2023.
Advisory Action in U.S. Appl. No. 15/396,453 dated Apr. 20, 2018.
Advisory Action in U.S. Appl. No. 15/396,468 dated Jan. 7, 2019.
Advisory Action in U.S. Appl. No. 15/396,475 dated Sep. 20, 2018.
Advisory Action in U.S. Appl. No. 15/396,614 dated Mar. 16, 2018.
Corrected Notice Allowance for U.S. Appl. No. 16/230,268 dated Oct. 9, 2020.
Corrected Notice Allowance for U.S. Appl. No. 16/231,467 dated Oct. 1, 2020.
Corrected Notice of Allowability for U.S. Appl. No. 16/230,493 dated Jul. 8, 2021.
Corrected Notice of Allowance for U.S. Appl. No. 15/396,368 dated Apr. 1, 2022.
Corrected Notice of Allowance for U.S. Appl. No. 15/396,453 dated Jun. 3, 2019.
Corrected Notice of Allowance for U.S. Appl. No. 15/396,468 dated Apr. 1, 2022.
Corrected Notice of Allowance for U.S. Appl. No. 15/396,468 dated Aug. 26, 2022.
Corrected Notice of Allowance for U.S. Appl. No. 15/396,468 dated Jun. 24, 2022.
Corrected Notice of Allowance for U.S. Appl. No. 15/396,468 dated Oct. 17, 2022.

(56) References Cited

OTHER PUBLICATIONS

Corrected Notice of Allowance for U.S. Appl. No. 15/396,475 dated Aug. 24, 2021.
Corrected Notice of Allowance for U.S. Appl. No. 15/396,475 dated Jul. 12, 2021.
Corrected Notice of Allowance for U.S. Appl. No. 15/396,624 dated Aug. 14, 2019.
Corrected Notice of Allowance for U.S. Appl. No. 15/396,624 dated Sep. 5, 2019.
Corrected Notice of Allowance for U.S. Appl. No. 15/986,286 dated May 27, 2021.
Corrected Notice of Allowance for U.S. Appl. No. 15/986,406 dated Jul. 16, 2021.
Corrected Notice of Allowance for U.S. Appl. No. 15/986,451 dated Aug. 11, 2021.
Corrected Notice of Allowance for U.S. Appl. No. 15/986,451 dated Jan. 5, 2022.
Corrected Notice of Allowance for U.S. Appl. No. 15/986,451 dated Nov. 16, 2021.
Corrected Notice of Allowance for U.S. Appl. No. 15/988,241 dated Aug. 13, 2020.
Corrected Notice of Allowance for U.S. Appl. No. 15/988,241 dated Jun. 22, 2020.
Corrected Notice of Allowance for U.S. Appl. No. 15/988,241 dated May 8, 2020.
Corrected Notice of Allowance for U.S. Appl. No. 15/988,241 dated Nov. 18, 2020.
Corrected Notice of Allowance for U.S. Appl. No. 15/988,308 dated Dec. 22, 2021.
Corrected Notice of Allowance for U.S. Appl. No. 15/988,308 dated Jan. 24, 2022.
Corrected Notice of Allowance for U.S. Appl. No. 15/988,308 dated Mar. 2, 2022.
Corrected Notice of Allowance for U.S. Appl. No. 15/988,308 dated Oct. 20, 2021.
Corrected Notice of Allowance for U.S. Appl. No. 15/988,492 dated Dec. 3, 2021.
Corrected Notice of Allowance for U.S. Appl. No. 15/988,492 dated Oct. 20, 2021.
Corrected Notice of Allowance for U.S. Appl. No. 16/128,104 dated Apr. 15, 2020.
Corrected Notice of Allowance for U.S. Appl. No. 16/128,104 dated Jul. 8, 2020.
Corrected Notice of Allowance for U.S. Appl. No. 16/128,104 dated Jun. 22, 2020.
Corrected Notice of Allowance for U.S. Appl. No. 16/128,104 dated May 20, 2020.
Corrected Notice of Allowance for U.S. Appl. No. 16/229,310 dated Apr. 27, 2021.
Corrected Notice of Allowance for U.S. Appl. No. 16/229,310 dated Jun. 3, 2021.
Non-Final Office Action for U.S. Appl. No. 15/988,572 dated Oct. 6, 2022.
Non-Final Office Action for U.S. Appl. No. 16/128,104 dated Aug. 21, 2019.
Non-Final Office Action for U.S. Appl. No. 16/229,310 dated Nov. 29, 2019.
Non-Final Office Action for U.S. Appl. No. 16/229,497 dated Dec. 12, 2019.
Non-Final Office Action for U.S. Appl. No. 16/229,614 dated Mar. 19, 2020.
Non-Final Office Action for U.S. Appl. No. 16/230,268 dated Jan. 8, 2020.
Non-Final Office Action for U.S. Appl. No. 16/234,870 dated Jan. 9, 2020.
Non-Final Office Action for U.S. Appl. No. 16/235,445 dated Apr. 2, 2020.
Non-Final Office Action for U.S. Appl. No. 16/236,673 dated Jan. 10, 2020.
Non-Final Office Action for U.S. Appl. No. 16/236,713 dated May 29, 2020.
Non-Final Office Action for U.S. Appl. No. 16/854,970 dated Feb. 17, 2022.
Non-Final Office Action for U.S. Appl. No. 16/854,970 dated Mar. 17, 2021.
Non-Final Office Action for U.S. Appl. No. 16/902,775 dated Oct. 5, 2020.
Non-Final Office Action for U.S. Appl. No. 16/918,085 dated Aug. 19, 2021.
Non-Final Office Action for U.S. Appl. No. 16/918,085 dated Mar. 31, 2022.
Non-Final Office Action for U.S. Appl. No. 16/985,444 dated Sep. 3, 2021.
Non-Final Office Action for U.S. Appl. No. 17/016,789 dated Sep. 22, 2022.
Non-Final Office Action for U.S. Appl. No. 17/017,052 dated Dec. 27, 2021.
Non-Final Office Action for U.S. Appl. No. 17/017,145 dated Dec. 22, 2021.
Non-Final Office Action for U.S. Appl. No. 17/017,241 dated Dec. 20, 2021.
Non-Final Office Action for U.S. Appl. No. 17/038,323 dated Jul. 1, 2021.
Non-Final Office Action for U.S. Appl. No. 17/094,102 dated Sep. 20, 2021.
Non-Final Office Action for U.S. Appl. No. 17/094,319 dated Dec. 8, 2021.
Non-Final Office Action for U.S. Appl. No. 17/147,887 dated Dec. 22, 2021.
Non-Final Office Action for U.S. Appl. No. 17/206,473 dated Dec. 22, 2022.
Non-Final Office Action for U.S. Appl. No. 17/206,473 dated Jun. 22, 2022.
Non-Final Office Action for U.S. Appl. No. 17/206,737 dated Jun. 23, 2022.
Non-Final Office Action for U.S. Appl. No. 17/206,737 dated Jun. 8, 2023.
Non-Final Office Action for U.S. Appl. No. 17/326,281 dated Aug. 18, 2022.
Non-Final Office Action for U.S. Appl. No. 17/340,538 dated Oct. 3, 2022.
Non-Final Office Action for U.S. Appl. No. 17/366,738 dated Dec. 9, 2022.
Non-Final Office Action for U.S. Appl. No. 17/408,680 dated Sep. 15, 2022.
Non-Final Office Action for U.S. Appl. No. 17/453,628 dated Sep. 27, 2022.
Non-Final Office Action for U.S. Appl. No. 17/527,817 dated Jun. 15, 2022.
Non-Final Office Action for U.S. Appl. No. 17/708,241 dated Dec. 20, 2022.
Non-Final Office Action for U.S. Appl. No. 17/734,704 dated Jun. 21, 2023.
Non-Final Office Action for U.S. Appl. No. 17/739,885 dated Mar. 30, 2023.
Non-Final Office Action for U.S. Appl. No. 17/742,468 dated Mar. 30, 2023.
Non-Final Office Action for U.S. Appl. No. 17/830,587 dated Nov. 25, 2022.
Non-Final Office Action for U.S. Appl. No. 18/149,332 dated Apr. 27, 2023.
Non-Final Office Action for U.S. Appl. No. 17/970,753 dated Aug. 17, 2023.
Non-Final Office Action for U.S. Appl. No. 18/147,421 dated Aug. 17, 2023.
Non-Final Office Action for U.S. Appl. No. 18/153,636 dated Jul. 19, 2023.
Non-Final Office Action in U.S. Appl. No. 15/396,453 dated Jun. 14, 2018.
Non-Final Office Action in U.S. Appl. No. 15/396,468 dated Jul. 3, 2018.

(56) References Cited

OTHER PUBLICATIONS

Non-Final Office Action in U.S. Appl. No. 15/396,468 dated Mar. 1, 2019.
Final Office Action for U.S. Appl. No. 16/229,497 dated Jun. 11, 2020.
Final Office Action for U.S. Appl. No. 16/229,614 dated Jul. 9, 2020.
Final Office Action for U.S. Appl. No. 16/230,268 dated Apr. 17, 2020.
Final Office Action for U.S. Appl. No. 16/234,870 dated Jul. 9, 2020.
Final Office Action for U.S. Appl. No. 16/235,445 dated Sep. 3, 2020.
Final Office Action for U.S. Appl. No. 16/236,713 dated Sep. 30, 2020.
Final Office Action for U.S. Appl. No. 16/854,970 dated Aug. 18, 2021.
Final Office Action for U.S. Appl. No. 16/854,970 dated Aug. 18, 2022.
Final Office Action for U.S. Appl. No. 16/918,085 dated Dec. 8, 2021.
Final Office Action for U.S. Appl. No. 16/918,085 dated Oct. 24, 2022.
Final Office Action for U.S. Appl. No. 17/017,241 dated Apr. 28, 2022.
Final Office Action for U.S. Appl. No. 17/038,323 dated Nov. 1, 2021.
Final Office Action for U.S. Appl. No. 17/206,473 dated Sep. 8, 2022.
Final Office Action for U.S. Appl. No. 17/206,737 dated Jan. 5, 2023.
Final Office Action for U.S. Appl. No. 17/408,680 dated Jan. 12, 2023.
Final Office Action for U.S. Appl. No. 17/408,739 dated Jan. 12, 2023.
Final Office Action for U.S. Appl. No. 15/988,572 dated May 12, 2021.
Final Office Action for U.S. Appl. No. 17/366,738 dated Jul. 20, 2023.
Final Office Action in U.S. Appl. No. 15/396,468 dated Jan. 26, 2018.
Final Office Action in U.S. Appl. No. 15/396,468 dated Nov. 15, 2018.
Final Office Action in U.S. Appl. No. 15/396,475 dated Feb. 25, 2019.
Final Office Action in U.S. Appl. No. 15/396,475 dated Jul. 12, 2018.
Final Office Action in U.S. Appl. No. 15/396,614 dated Oct. 25, 2018.
Final Office Action in U.S. Appl. No. 15/396,624 dated Jan. 24, 2019.
Final Rejection Mailed on Aug. 18, 2021 for U.S. Appl. No. 16/854,970, 6 page(s).
Final Rejection Mailed on Feb. 25, 2019 for U.S. Appl. No. 15/396,475, 8 page(s).
Final Rejection Mailed on Jun. 11, 2020 for U.S. Appl. No. 16/229,497, 17 page(s).
Non-Final Office Action dated Aug. 17, 2023, for U.S. Appl. No. 18/147,421, (7 pages), United States Patent and Trademark Office, US.
Non-Final Office Action for U.S. Appl. No. 15/396,468 dated Feb. 4, 2020.
Non-Final Office Action for U.S. Appl. No. 15/396,468 dated Jun. 1, 2021.
Non-Final Office Action for U.S. Appl. No. 15/396,475 dated Aug. 6, 2020.
Non-Final Office Action for U.S. Appl. No. 15/396,475 dated Aug. 8, 2019.
Non-Final Office Action for U.S. Appl. No. 15/396,624 dated Oct. 16, 2019.
Non-Final Office Action for U.S. Appl. No. 15/986,218 dated Sep. 27, 2019.
Non-Final Office Action for U.S. Appl. No. 15/986,286 dated Nov. 29, 2019.
Non-Final Office Action for U.S. Appl. No. 15/986,361 dated Jul. 11, 2019.
Non-Final Office Action for U.S. Appl. No. 15/986,406 dated Dec. 18, 2019.
Non-Final Office Action for U.S. Appl. No. 15/986,406 dated Oct. 30, 2020.
Non-Final Office Action for U.S. Appl. No. 15/986,451 dated Apr. 16, 2020.
Non-Final Office Action for U.S. Appl. No. 15/986,451 dated Jun. 27, 2019.
Non-final Office Action for U.S. Appl. No. 15/988,241 dated Jun. 27, 2019.
Non-Final Office Action for U.S. Appl. No. 15/988,308 dated Dec. 3, 2019.
Non-Final Office Action for U.S. Appl. No. 15/988,308 dated Sep. 8, 2020.
Non-Final Office Action for U.S. Appl. No. 15/988,472 dated Dec. 27, 2019.
Non-Final Office Action for U.S. Appl. No. 15/988,492 dated Apr. 14, 2021.
Non-Final Office Action for U.S. Appl. No. 15/988,492 dated Feb. 18, 2020.
Non-Final Office Action for U.S. Appl. No. 15/988,492 dated Sep. 10, 2020.
Non-Final Office Action for U.S. Appl. No. 15/988,572 dated Aug. 25, 2021.
Non-Final Office Action for U.S. Appl. No. 15/988,572 dated Dec. 27, 2019.
Non-Final Office Action for U.S. Appl. No. 15/988,572 dated Nov. 6, 2020.
Notice of Allowance in U.S. Appl. No. 15/396,453 dated Jan. 10, 2019.
Notice of Allowance in U.S. Appl. No. 15/396,462 dated Jun. 1, 2018.
Notice of Allowance in U.S. Appl. No. 15/396,462 dated May 15, 2018.
Notice of Allowance in U.S. Appl. No. 16/236,673 dated May 1, 2020.
Office Action in U.S. Appl. No. 15/396,453 dated Feb. 27, 2018.
Office Action in U.S. Appl. No. 15/396,475 dated Mar. 29, 2018.
Restriction Requirement for U.S. Appl. No. 16/231,467 dated Feb. 5, 2020.
Supplemental Notice of Allowability for U.S. Appl. No. 15/988,492 dated Dec. 14, 2021.
Supplemental Notice of Allowance for U.S. Appl. No. 15/986,218 dated Jan. 27, 2021.
Supplemental Notice of Allowance for U.S. Appl. No. 15/986,406 dated Apr. 7, 2021.
Supplemental Notice of Allowance for U.S. Appl. No. 15/986,406 dated Jun. 9, 2021.
Supplemental Notice of Allowance for U.S. Appl. No. 15/988,492 dated Nov. 9, 2021.
Supplemental Notice of Allowance for U.S. Appl. No. 17/527,817 dated Feb. 28, 2023.
Supplemental Notice of Allowance for U.S. Appl. No. 17/527,817 dated Jan. 5, 2023.
Non-Final Rejection Mailed on Mar. 26, 2025 for U.S. Appl. No. 18/323,582, 10 page(s).
Final Rejection Mailed on Dec. 3, 2024 for U.S. Appl. No. 18/323,582, 9 page(s).
Final Rejection Mailed on Dec. 19, 2024 for U.S. Appl. No. 18/508,682, 8 page(s).
Non-Final Rejection Mailed on Dec. 3, 2024 for U.S. Appl. No. 18/635,550, 13 page(s).
Non-Final Rejection Mailed on Jan. 16, 2025 for U.S. Appl. No. 18/748,775, 14 page(s).
Non-Final Rejection Mailed on Nov. 21, 2024 for U.S. Appl. No. 18/620,001, 12 page(s).

(56) References Cited

OTHER PUBLICATIONS

Final Rejection Mailed on Jun. 18, 2024 for U.S. Appl. No. 17/875,775, 10 page(s).
Non-Final Rejection Mailed on Jun. 13, 2024 for U.S. Appl. No. 18/323,582, 13 page(s).
Non-Final Rejection Mailed on Jun. 18, 2024 for U.S. Appl. No. 17/394,265, 12 page(s).
Non-Final Rejection Mailed on Jun. 18, 2024 for U.S. Appl. No. 18/508,682, 7 page(s).
Final Rejection Mailed on Apr. 8, 2026 for U.S. Appl. No. 18/766,103, 11 page(s).
Non-Final Rejection Mailed on Apr. 2, 2026 for U.S. Appl. No. 19/029,425, 14 page(s).
Non-Final Rejection Mailed on Apr. 2, 2026 for U.S. Appl. No. 19/030,469, 13 page(s).
Non-Final Rejection Mailed on Apr. 8, 2026 for U.S. Appl. No. 18/819,563, 15 page(s).
Non-Final Rejection Mailed on Jan. 27, 2026 for U.S. Appl. No. 18/323,582, 11 page(s).

* cited by examiner

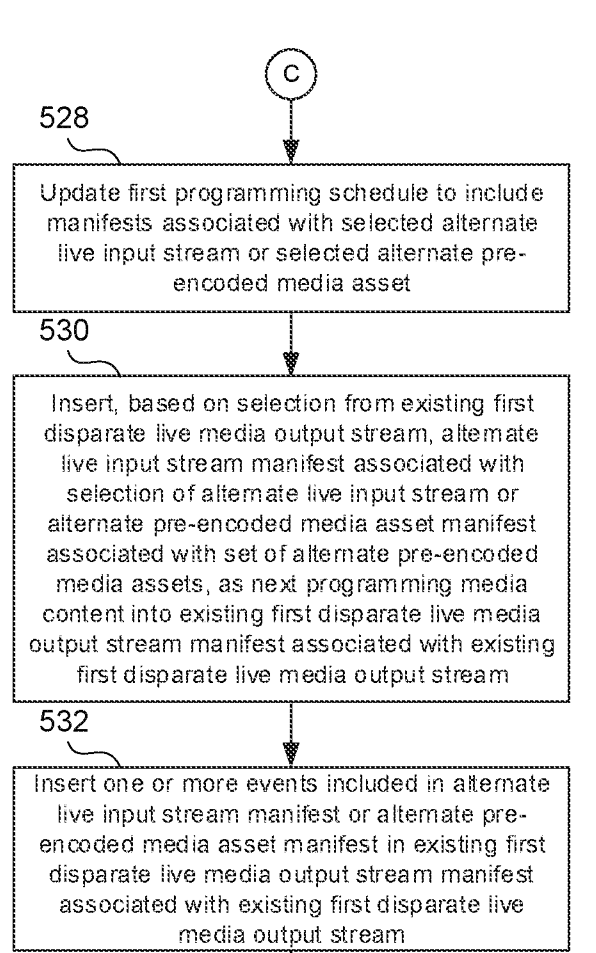

D

536

Update first programming schedule to include manifests associated with selected alternate live input stream and selected alternate pre-encoded media asset corresponding to multiple audience segments with same count within given threshold of user selections

538

Insert, based on at least two distinct user selections on existing first disparate live media output stream, corresponding alternate live input stream manifest associated with selection of alternate live input stream and alternate pre-encoded media asset manifest associated with set of alternate pre-encoded media assets into at least two branched second disparate live media output stream manifests associated with existing first disparate live media output stream

540

Insert one or more events included in corresponding alternate live input stream manifest and alternate pre-encoded media asset manifest into at least two branched second disparate live media output stream manifests associated with existing first disparate live media output stream

542

Publish at least two branched second disparate live media output stream manifests, each including corresponding selected alternate live input stream manifest and selected alternate pre-encoded media asset manifest, to content delivery system

FIG. 5C

PUBLISHING DISPARATE LIVE MEDIA OUTPUT STREAMS IN MIXED MODE BASED ON USER SELECTION

CROSS-REFERENCE TO RELATED APPLICATIONS/INCORPORATION BY REFERENCE

This Patent Application is a Continuation of U.S. patent application Ser. No. 17/734,704, filed on May 2, 2022, which is a Continuation of U.S. Pat. No. 11,375,248, issued on Jun. 28, 2022, which is a Continuation of U.S. Pat. No. 10,856,016, issued on Dec. 1, 2020, which is a Continuation-in-part of U.S. Pat. No. 11,134,309, issued on Sep. 28, 2021, and claims priority to, and the benefit from U.S. Provisional Application Ser. No. 62/699,131, filed Jul. 17, 2018.

This application also makes reference to:

U.S. Pat. No. 10,924,804, issued on Feb. 16, 2021;

U.S. Pat. No. 11,051,061, issued on Jun. 29, 2021;

U.S. Pat. No. 11,051,074, issued on Jun. 29, 2021;

U.S. Pat. No. 10,992,973, issued on Apr. 27, 2021; and

U.S. Pat. No. 11,038,932, issued on Jun. 15, 2021.

Each of the above referenced patent applications is hereby incorporated herein by reference in its entirety.

FIELD OF TECHNOLOGY

Certain embodiments of the disclosure relate to a television content packaging and distribution system. More specifically, certain embodiments of the disclosure relate to a method and system for publishing disparate live media output streams in mixed mode based on user selection.

BACKGROUND

Recent advancements in the field of television content packaging and distribution systems have led to a massive development of numerous technologies and broadcasting platforms that are revolutionizing the way consumer devices access and playout media content. Usually, broadcasting platforms refer to the types of networks that are used to deliver the media content to the consumers. Currently, the broadcasting platforms, such as analog terrestrial broadcast, digital terrestrial broadcast, direct-to-home satellite broadcast, cable, Internet Protocol (IP), and over-the-top television (OTT), compete and strive to increase their appeal by gaining and retaining the audience viewing the media content.

Modern streaming protocols, such as HTTP Live Streaming (HLS) and Dynamic Adaptive Streaming over HTTP (DASH), are implemented to support streaming of various live content services, such as through DIRECTV NOWS™, SLING TVS™ and PLAYSTATION™ VUE, to consumer devices. Due to dissemination of such modern streaming protocols in the television, radio, and broadcasting sector, it is evident that the success of broadcasting will be dependent on the ability of the network provider to gain access to the content that consumers demand, and to differentiate their offering from that of incumbent broadcasters or find breakthrough modes of media content delivery.

Increased competition has led the broadcast providers (or the network providers) to differentiate their offering and handle multiple channels at the same time, which in turn have added unparalleled levels of complexity. This requires installation of large infrastructures and resources to maintain uninterrupted media content delivery for existing channels and also meet the ever-increasing demand of new channels.

Given the trends toward media content distribution, there is required a television content packaging and distribution system that may decide what type of media content is to broadcast as disparate live media output streams and when to air them, defined by a programming schedule. The type of media content may correspond to live input streams, pre-encoded media assets, or an intelligent combination of the live input streams and pre-encoded media assets in mixed mode. Accordingly, the disparate live media output streams may be organized into channels to be delivered to consumers and ensure an adequate or maximum utilization of airtime. Further, there is required a system that may create branches of the channel based on user selection to maximize audience retention at various transitions within the disparate live media output stream manifests. This may provide the network provider with the capability to not only provide new channel offerings in cost-effective manner but also provide enhanced, intelligent, and personalized viewer experience to increase their appeal in order to gain a wider audience and retain the audience viewing the media content.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY OF THE DISCLOSURE

Systems and/or methods are provided for publishing disparate live media output streams in mixed mode based on user selection, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIGS. 5A, 5B, and 5C collectively depict a flowchart illustrating exemplary operations for publishing disparate live media output streams in mixed mode based on user selection in the dynamic mixed mode publishing system of FIG. 1B, in accordance with an exemplary embodiment of the disclosure.

DETAILED DESCRIPTION OF THE DISCLOSURE

Figure 1A:
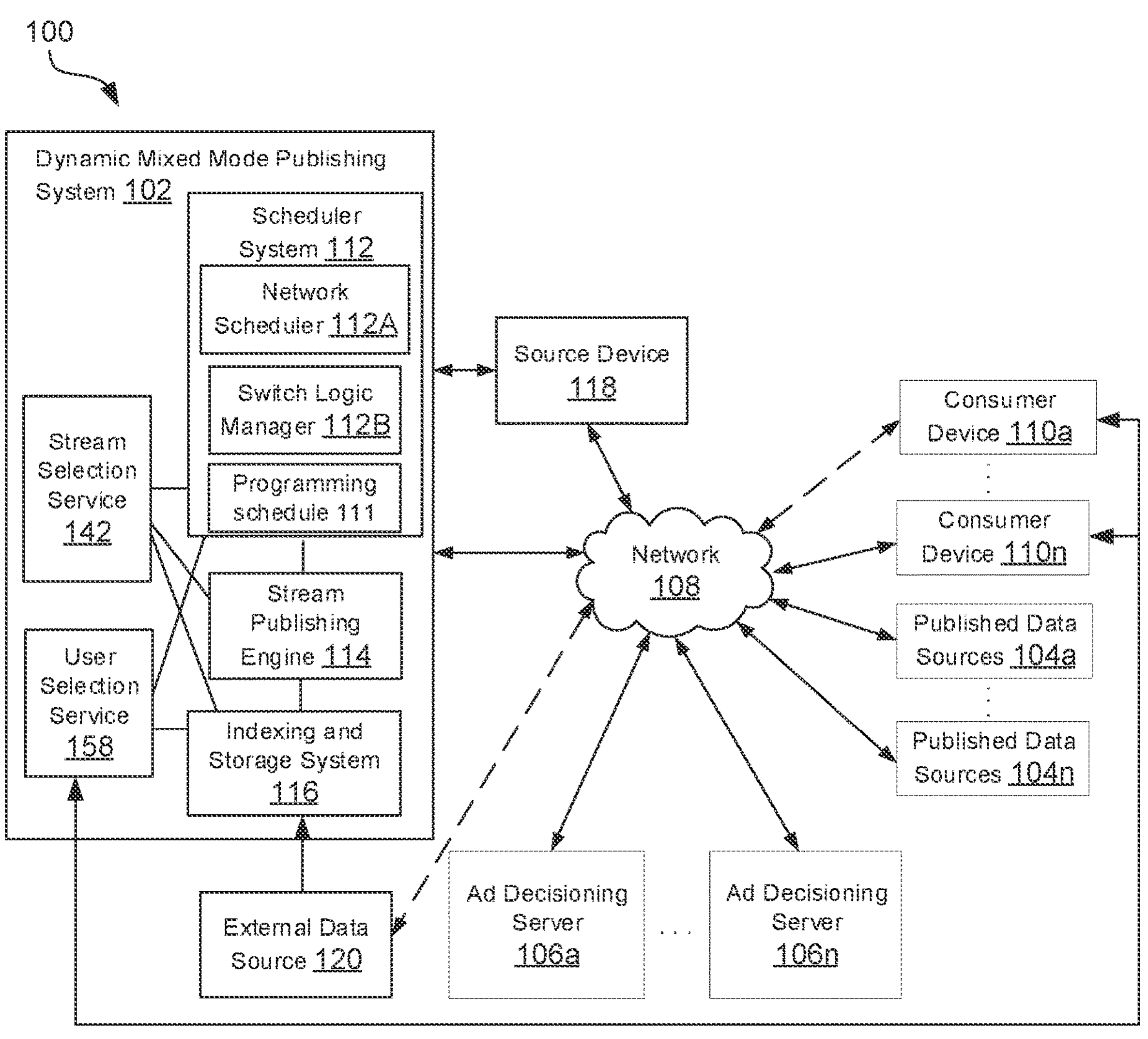
FIG. 1A is a block diagram that illustrates an exemplary system for publishing disparate live media output streams in mixed mode based on user selection, in accordance with an exemplary embodiment of the disclosure.

Certain embodiments of the disclosure may be found in a method and system for publishing disparate live media output streams in mixed mode based on user selection. Various embodiments of the disclosure provide a method and system that dynamically generates branches of a live channel, and provides the network provider with the capability to not only provide live channel offerings in cost-effective manner but also provide enhanced, intelligent, and personalized viewer experience to increase their appeal by retaining the audience viewing the media content.

Modern streaming protocols, such as HLS and DASH, break media content into numerous small media content segments, typically less than 10 seconds in length. Further, the modern streaming protocols implement manifests that instruct a media player on what media content segment to retrieve and play next. The manifest may enlist the media segments that make up the full length of the media asset. The manifest may include information, based on which the media player at a consumer device may be able to determine the media segments. The manifest and/or media content segment may also include and/or specify additional information to facilitate a media player to transition smoothly between media content streams from different sources. The manifest may be used for creating a playlist of multiple media content files, or for interrupting media content with advertising and then resuming the media content.

Such modern streaming protocols support video-on-demand (VOD) assets and live content as well. The VOD assets prepared for distribution, for example Internet distribution, may have a sequence of short duration segments added to a manifest. The short duration segments may be separate physical files or pointers (real or to be calculated) to the short media content segments inside a larger file. On the other hand, in case of live content, new short content media segments are made available as soon as they are created. In some protocols, each new segment is added to a manifest while in others the media player is provided with information that may be utilized to calculate what the next live segment will be. In the latter case, a signal in the media content itself is used to inform the player when to re-inspect or check the manifest for a change in media content. In live streaming, delivery of live content is supported by making available each new short media content segments as soon as such media content segments are generated. In some protocols, new media content segments may be added to the manifest, while in others, the media player calculates necessary information about the next live media content segments.

In accordance with various embodiments of the disclosure, a dynamic mixed mode publishing system or apparatus is provided for publishing disparate live media output streams in mixed mode based on user selection. One or more processors in the dynamic mixed mode publishing system, during streaming of an existing first disparate live media output stream on a media player, may be configured to determine a set of alternate live input streams and/or a set of alternate pre-encoded media assets, and associated alternate live media output manifests and/or associated alternate pre-encoded media assets manifests, respectively, based on one or more parameters and metadata associated with the existing first disparate live media output stream. The one or more processors may be further configured to transmit, based on an indicator in a first disparate live media output stream manifest associated with the existing first disparate live media output stream, alternate content options to the media player. The alternate content options may comprise one or more options corresponding to the set of alternate live input streams and/or the set of alternate pre-encoded media assets. The one or more processors may be further configured to receive a response corresponding to a selection of an alternate live input stream and/or an alternate pre-encoded media asset from a set of alternate live input streams or a set of alternate pre-encoded media assets, respectively. The one or more processors may be further configured to insert, based on the selection from the existing first disparate live media output stream, an alternate live input stream manifest associated with the selection of an alternate live input stream and/or the an alternate pre-encoded media asset manifest associated with the set of alternate pre-encoded media assets into the existing first disparate live media output stream manifest associated with the existing first disparate live media output stream.

FIG. 1A is a block diagram that illustrates an exemplary system for publishing disparate live media output streams in mixed mode based on user selection, in accordance with an exemplary embodiment of the disclosure. Referring to FIG. 1A, the system 100, comprises a dynamic mixed mode publishing system 102 that is communicatively coupled to published data sources 104*a*, . . . , 104*n*, Ad decisioning servers 106*a*, . . . , 106*n*, via a network 108 and/or other programmatic means. There are shown consumer devices 110*a*, . . . , 110*n* that are communicatively coupled to the network 108. The dynamic mixed mode publishing system 102 may comprise at least a scheduler system 112, a stream publishing engine 114, an indexing and storage system 116, a stream selection service 142, and a user selection service 158. The scheduler system 112 may further include a network scheduler 112A, a switch logic manager 112B, and programming schedule 111. There are also shown source devices 118 communicatively coupled to the dynamic mixed mode publishing system 102 through the network 108. An external data source 120 is also provided, which is communicatively coupled to the dynamic mixed mode publishing system 102 through the network 108.

The dynamic mixed mode publishing system 102 may comprise suitable logic, circuitry, and interfaces that may be configured to execute code that handles media content comprising audio, video, images, metadata, manifests, and/or other data (embedded and/or externally referenced). The media content may include a video, an audio, a combination of audio and video presentations, and/or embedded or externally referenced metadata, a combination of multiple-audio, multiple-video, and/or embedded or externally referenced metadata. In accordance with an embodiment, the dynamic mixed mode publishing system 102 may be configured to update the programming schedule 111 of an existing first disparate live media output stream based on a user selection corresponding to an alternative live input stream and/or a pre-encoded media asset. Accordingly, the dynamic mixed mode publishing system 102 personalizes the existing first disparate live media output stream based on the user selection. In accordance with another embodiment, the dynamic mixed mode publishing system 102 may be configured to publish a plurality of branched disparate live media output stream manifests, each including corresponding selected alternate live input stream manifest and/or selected alternate pre-encoded media asset manifest, to a content delivery system. Corresponding plurality of branched disparate live media output stream manifests may be played out by a plurality of media players at the plurality of consumer devices 110*a*, . . . , 110*n*.

In this regard, the dynamic mixed mode publishing system 102 may provide video programming services to viewers, usually for a subscription fee (such as pay television). The dynamic mixed mode publishing system 102 also handles distribution, for example, multicasting, unicasting, broadcasting, streaming, for one or more channels to be viewed on one or more of the plurality of consumer devices 110*a*, . . . , 110*n*.

The dynamic mixed mode publishing system 102 may be operated by an entity related to handling or distribution of media content, for example, a broadcast provider or operator, or a network provider or network operator. The entity related to handling or distribution of media content may also be referred to as a content owner, a distributor, a syndicator, a re-distributor, a content aggregator, a search, discovery, or cataloging service provider, or any other entity actively or passively involved with the distribution, cataloging, or referencing of complete or partial presentations of media content. Throughout this document, the terms broadcast provider or broadcast operator, and network provider or network operator may be utilized to refer to the entity related to handling or distribution of media content, interchangeably. The broadcast provider may handle a single channel or a plurality of channels, or one or more networks. The broadcast provider may be configured to distribute content via one or more platforms, for example, traditional over-the-air broadcast channels, radio, cable television networks, satellite communication networks, the Internet, and/or other content delivery networks (CDNs). In this regard, the broadcast provider may be configured to execute code that communicates linear video feeds (also referred to as a network television feed or broadcast feed) to the dynamic mixed mode publishing system 102. In a broadcast chain, the broadcast provider may receive actual content, for example, from a production studio, in a serial digital interface (SDI) video interface and/or on a high-definition SDI (HD-SDI) video interface, process the content, such as insertion of graphics, closed captions, preparation of the programming schedule 111, insertion of triggers, and the like, and final delivery by a broadcasting apparatus. The communicated linear video feed and the playout schedule may correspond to a channel, such as CNN channel that is broadcast to the dynamic mixed mode publishing system 102, via a communication network. The linear video feed may be broadcasted as a multi-program transport stream (MPTS) (also referred to as a live video feed) to the dynamic mixed mode publishing system 102, via the network 108. In an embodiment, a live stream encoder/packager may be configured to convert the MPTS to web distribution protocols prior to feeding. The broadcast provider may be owned by (or associated to) a broadcast provider or operator, a network provider or operator, or a content provider or operator.

The dynamic mixed mode publishing system 102 may receive the web distribution protocols, which includes the signaling content and metadata, from the broadcast provider based on, for example, current society of cable telecommunication engineers (SCTE) standards (SCTE-35 and SCTE-224) to control web and regional blackouts, network end of day switching, and advertisement insertion. For example, the dynamic mixed mode publishing system 102 may be signaled for various blackout types with in-band SCTE-35 message. Further, the dynamic mixed mode publishing system 102 may receive program metadata that specifies certain events or operations, such as, for example, when to blackout shows. The dynamic mixed mode publishing system 102 may benefit various entities, for example direct-broadcast satellite (DBS) providers, cable television (CATV) systems, and other wireline video providers and competitive local exchange carriers (CLECs) using, for example, IPTV.

Each of the plurality of published data sources 104*a*, . . . , 104*n* may be coupled to one or more television networks and may comprise suitable logic, circuitry, and interfaces that may be configured to execute code that provides actual audiences for programs that were distributed. As illustrated in FIG. 1A, the plurality of published data sources 104*a*, . . . , 104*n* are coupled to the dynamic mixed mode publishing system 102 via the network 108 and configured to monitor audience drift to or away from a tuned channel airing a live media output stream. The plurality of published data sources 104*a*, . . . , 104*n* may provide actual audiences for programs to the indexing and storage system 116. An exemplary published data source may be Nielsen. Nielsen has the capability to determine when a viewer watches the same set of media items, for example, advertisements and/or promotional content, in programming data, such as an episode, in a live video feed within 3 days of original airing, and provide Nielsen "C3" credit. Another exemplary published data source may be a published database that provides ratings for a media item, such as gross rating point (GRP). The GRP is advertising or promotion impact measure for each advertising and/or promotional campaigns, known in the art. Other exemplary published data sources may also include direct/indirect access to other public or private data sources (persistent or ephemeral) through programmatic means.

The Ad decisioning servers 106*a*, . . . , 106*n* may comprise suitable logic, circuitry, and interfaces that may be configured to implement at least an advertisement decisioning component that may be used during a real-time content or advertisement placement activity, for example during dynamic ad insertion. For example, commercial or non-commercial advertisements may be dynamically inserted within program segments of the live input streams by the Ad decisioning servers 106*a*, . . . , 106*n* based on the upcoming indicator detected by the media player or a non-programming content proxy server. The detected indicator may be, for example, an inbound trigger, a signaling point, and/or a signal in a pre-encoded media asset and/or a live input stream. The Ad decisioning servers 106*a*, . . . , 106*n* may receive a request for retrieval of non-programming content, for example, ads, from a non-programming content proxy server (not shown). Specifically, the Ad decisioning servers 106*a*, . . . , 106*n* may receive the request from one or more of the plurality of consumer devices 110*a*, . . . , 110*n*, via the non-programming content proxy server (not shown). The request may be received when one or more indicators and/or pre-encoded place holder content segment for a scheduled duration of one or more non-programming content breaks. The scheduled durations of one or more non-programming content breaks may be defined by a received programming schedule 111, and are encountered in the disparate live media output stream manifest during media content playout by media players at the one or more of the plurality of consumer devices 110*a*, . . . , 110*n*.

Thus, for requests received from the plurality of consumer devices 110*a*, . . . , 110*n*, based on corresponding disparate live media output stream manifests, the Ad decisioning servers 106*a*, . . . , 106*n* may identity the opportunities for the real-time content or advertisement placement activity. In this regard, as the advertisement decisioning component of the Ad decisioning servers 106*a*, . . . , 106*n* is implemented in a consumer device, such as one or more of the plurality of consumer devices 110*a*, . . . , 110*n*, the Ad decisioning servers 106*a*, . . . , 106*n* may identify real-time content or advertisement placement opportunity for dynamic ad insertion. For example, commercial or non-commercial advertisements may be dynamically inserted within program segments of a media feed based on the detected indicator, such as upcoming inbound trigger, signaling point, and/or signal, in the disparate live media output stream manifest by the Ad decisioning servers 106*a*, . . . , 106*n* when the ad decisioning component is implemented in the consumer device. In various embodiments, the advertisement decisioning component of the Ad decisioning servers 106*a*, . . . , 106*n* may be configured to determine which advertisements, overlay graphics and presentation information to serve to the consumer devices 110*a*, . . . , 110*n* based on stream ID, a program ID, a geographical location, time, and any preferences associated with an individual consumer or an advertisement ID specified by the disparate live media output stream manifest.

The network 108 may be any kind of network, or a combination of various networks, and it is shown illustrating the communication that may occur between the Ad decisioning servers 106*a*, . . . , 106*n* and the dynamic mixed mode publishing system 102. For example, the network 108 may comprise one or more of a cable television network, the Internet, a satellite communication network, a wide area network (WAN), a medium area network (MAN), and a local area network (LAN). Although a network 108 is shown, the disclosure is not limited in this regard; accordingly, other exemplary modes may comprise uni-directional or bi-directional distribution, such as packet-radio, satellite. Furthermore, the network 108 is an exemplary embodiment of a distribution system.

The consumer devices 110*a*, . . . , 110*n* may refer to end-user devices or consumption devices where the content is played to be consumed by a user. The number of impressions of a media item, such as an advertisement and/or promotional media, on such plurality of consumer devices 110*a*, . . . , 110*n* determines the advertising impact or promotion impact and number of actual audiences achieved during campaigns. Examples of the consumer devices 110*a*, . . . , 110*n* may include, but are not limited to, connected TVs, connected TV with paired and/or connected devices (e.g., HDMI sticks, tablets), personal computer, smartphone, tablet, OTT set-top, or hybrid set-top, and second screen devices such as smartphones, tablets, game consoles, personal computers, set-top boxes, and embedded devices. The consumer devices 110*a*, . . . , 110*n* may further include process/system that may process the output for any means, regardless of the capability or intent to decode for media presentation, and on which the consumer may launch a web page, a web application, or a web service to view media content.

The scheduler system 112 may comprise suitable logic, circuitry, and interfaces that may be configured to execute a code that creates and handles a programming schedule of programming media content, such as pre-encoded (or on-demand media assets) and live input streams, for a channel. The scheduler system 112 may include a network scheduler 112A configured to manage a media assets programming schedule for the pre-encoded media assets and/or live input streams, and a switch logic manager 112B configured to manage the live programming schedule 111 for the live input streams by leveraging the output of the network scheduler 112A and the programming schedule 111 that may be generated and submitted to the stream publishing engine 114, the indexing and storage system 116, and an updated programming schedule 113 (FIG. 1B), based upon input from the aforementioned systems.

The media assets programming schedule of the pre-encoded media assets for the channel defines which pre-encoded media assets should be scheduled, time and duration at which the pre-encoded media assets should be played in the generated disparate live media output streams, the ordering of the pre-encoded media assets during playout, and when to distribute the media content to the consumer devices 110*a*, . . . , 110*n* over the web application, service or page. The network scheduler 112A may create the media assets programming schedule based on a desired theme, content metadata, content rights, content eligibility, and content availability of the pre-encoded or on-demand media assets. The network scheduler 112A may also format non-programming break, such as ad break, durations and locations, as well as graphic overlay locations on the pre-encoded or on-demand media assets displayed on the consumer devices 110*a*, . . . , 110*n*. The media content that is distributed may include both the programming content, such as long-form presentations, short-form presentations, news or sporting events, and non-programming content, such as paid advertisements, public service advertisements, or promotional material.

In accordance with an embodiment, the media assets programming schedule and the live programming schedule may comprise data structures or file formats capable of being processed by a computer, that comprise a reference mapping of different media content items that needs to be utilized by the stream publishing engine 114. For example, the network scheduler 112A may receive a programming schedule 111 of an existing channel from the source devices 118. The network scheduler 112A may modify the received programming schedule 111 to generate the media assets programming schedule. The generation of the media assets programming schedule may be driven by real time or near-real time content context analysis, user-selection on a consumer device, such as the consumer devices 110*a*, . . . , 110*n*, or driven by external data received from the external data source 120. The generation of the media assets programming schedule may enable publishing another disparate live media output stream using pre-encoded media assets. The media content, for example, that is distributed may include both the programming media content, such as long-form presentations, short-form presentations, news or sporting events, and non-programming media content, such as paid advertisements, public service advertisements, or promotional material.

The live programming schedule defines which live input streams should be scheduled, time and duration at which the live input streams should be played in the generated disparate live media output streams, the ordering of the live input streams during playout, and when to distribute the media content to the consumer devices 110*a*, . . . , 110*n* over the web application, service or page. The switch logic manager 112B may create the live programming schedule based on the media assets programming schedules generated by the network scheduler 112A, various live input stream schedules, rights and preferences databases, and data provided by the stream owner/operator. The switch logic manager 112B may also determine required number of disparate live media output streams. For example, the switch logic manager 112B may determine that for live input streams from 35 regional sources, based on schedules, rights, and user preferences, 210 or more disparate live media output streams are generated. In an embodiment, The switch logic manager 112B may modify the received programming schedule 111 to generate a live programming schedule, where the generation of the updated programming schedule may be driven by real time or near-real time content context analysis, stream selection service 142, schedules, content and tights databases, user-selection on a consumer device, such as the consumer devices 110*a*, . . . , 110*n*, or driven by external data received from the external data source 120.

In accordance with an embodiment, the media assets programming schedule and the live programming schedule may be XML files or data sets, which may comprise a reference mapping of different media content items or media segments of the pre-encoded media assets and live input streams, respectively. The scheduler system 112 may be configured to communicate the programming schedule 111, such as the media assets programming schedule (from the network scheduler 112A) or the live programming schedule (from the network scheduler 112A or switch logic manager 112B), to the stream publishing engine 114 for publishing disparate live media output streams.

The stream publishing engine 114 may comprise suitable logic, circuitry, and interfaces that may be configured to execute a code to generate a first disparate live media output stream for a new channel to be viewed on a consumer device in accordance with the specified programming schedule 111. In accordance with an embodiment, the stream publishing engine 114 may be configured to generate publish two or more branched second disparate live media output stream manifests, each including corresponding selected alternate live input stream manifest and/or selected alternate pre-encoded media asset manifest, to content delivery system. The stream publishing engine 114 may be configured to publish the existing first disparate live media output stream manifest and the two or more branched second disparate live media output stream manifests by leveraging different indices created by the indexing and storage system 116, based on the generated programming schedule 111 or an updated programming schedule, respectively. Accordingly, the stream publishing engine 114 may generate the existing first disparate live media output stream manifest and the two or more branched second disparate live media output stream manifests to be delivered to one or more of the plurality of consumer devices 110*a*, . . . , 110*n* over a web page, service or application, based on manipulated manifests. In accordance with an embodiment, the stream publishing engine 114 may be configured to insert media segments that are referenced by manifests associated with a plurality of pre-encoded media assets and/or live input streams indexed by the indexing and storage system 116 into the existing first disparate live media output stream manifest on intervals equal to a content segment duration to generate an updated disparate live media output stream for a new channel. The manifest may correspond to the data set that may instruct the consumer device 110*a*, . . . , 110*n* on which and where to acquire the live input streams and the pre-encoded media assets to play. The existing first disparate live media output stream manifest and the two or more branched second disparate live media output stream manifests, thus generated, are in a suitable state (or ready) to be distributed to media players in one or more of the plurality of consumer devices 110*a*, . . . , 110*n*. There may not be any requirement to re-encode the pre-encoded media assets and/or the live input streams before the distribution of the disparate live media output stream for the new channel(s).

In this regard, the existing first disparate live media output stream may be tailored and personalized for a single consumer device 110*a*, . . . , 110*n* based on corresponding user selection. On the other hand, the two or more branched second disparate live media output stream may be tailored for multiple audience segments of a plurality of the consumer devices 110*a*, . . . , 110*n* when user selections corresponding to such multiple audience segments are at a tie. The decisioning as to which the pre-encoded media assets and/or live input streams to select for delivery over the network 108 to the one or more of the plurality of consumer devices 110*a*, . . . , 110*n* may be based on the manipulation of the manifests that correspond to the programming schedules 111 or updated programming schedules in real time or near-real time. The manipulation of the manifests correspond to the programming schedules that may be driven by, for example real time or near-real time content context analysis, user-selection on the consumer devices 110*a*, . . . , 110*n*, or external data received from the external data source 120, in addition to the real-time data, such as schedule, rights, and preferences databases, and stream operator preferences, received from various databases, as described in detail in FIG. 1B.

The indexing and storage system 116 may comprise suitable logic, circuitry, and interfaces that may be configured to be continuously ingested with a plurality of manifests associated with the pre-encoded media assets and/or the plurality of live input streams. The indexing and storage system 116 may also store, maintain, index, and/or validate the live input streams and the pre-encoded media assets with corresponding manifests. The indexing and storage system 116 may also generate alerts in case validation fails. In accordance with an embodiment, the indexing and storage system 116 may be configured to ingest the manifests of the pre-encoded media assets and/or the live input streams, and index the listed media segments, indexing of program boundaries and tags marking, advertisement break locations, overlay opportunities credits, digital rights management systems supported in the indexing and storage system 116. The indexing and storage system 116 may further log all tags indicating ad breaks, program start, program end, and the like for the pre-encoded media assets and live input streams. Based on the tags in manifests, transitions between live input streams and pre-encoded media assets, according to the stream owner/operator preferences as detailed by the switch logic manager 112B, may be handled correctly. Further, the tags enable insertion of additional information in the disparate live media output stream manifest to help the media player transition smoothly between media content from different live input streams and pre-encoded media assets, including but not limited to, discontinuity tags.

The source devices 118 may comprise suitable logic, circuitry, and interfaces that may be configured to communicate a live media feed or live input streams of a channel, such as an existing channel, to the dynamic mixed mode publishing system 102. In accordance with an embodiment, the live input streams of the channel may correspond to a broadcast feed. The source device 118 may be communicatively coupled to the network 108.

The external data source 120 may comprise suitable logic, circuitry, and interfaces that may be configured to execute code that handles retrieval and storage of audience data that corresponds to subscribers of the plurality of consumer devices 110*a*, . . . , 110*n*. The audience data may include demographics data, audience targeting data, trending data, device type data, device platform data, and content recognition-based data, such as automatic content recognition (ACR)-based data. The trending data comprises information on what's trending in the social networks (or platforms), such as Twitter®, Facebook®, and the like. The trending data also comprises information on what's trending based on social engagement, such as number of likes or votes to a particular media item, or number of people watching a particular media item. The trending data may indicate an aggregate interest level of a number of users in the social networks for a particular media item. For example, a thousand or more shares, or likes by a number of users may indicate a highly popular media item.

The stream selection service 142 may comprise suitable logic, circuitry, and interfaces that may be configured to execute code that may be configured to provide a consumer device, for example, the consumer device 110*a*, requesting to view the existing first disparate live media output stream with a correct variant of disparate live media output stream, based on the geolocation and identification of the consumer device 110*a*, along with data retrieved from the schedules, rights, and preferences databases. The stream selection service 142 may further receive a user selection that corresponds to a selection of a user associated with the consumer device 110*a* to view the recommended/desired disparate live media output stream on the consumer device 110*a*. The stream selection service 142 may further store the received selection in the schedules, rights, and preferences databases, and also communicates to the switch logic manager 112B and the stream publishing engine 114. The stream selection service 142 acts as an interface between the switch logic manager 112B of the dynamic mixed mode publishing system 102 and the plurality of consumer devices 110*a*, . . . , 110*n*, such as the consumer device 110*a*.

The user selection service 158 may comprise suitable logic, circuitry, and interfaces that may be configured to execute code that may be configured to receive a request from the plurality of consumer devices 110*a*, . . . , 110*n*, such as the consumer device 110*a*, and accordingly at the appropriate time delivers a set of possible alternate programming media content options for the next programming media content in the updated programming schedule for the existing first disparate live media output stream. The user selection service 158 may be configured to access to live stream schedule (indicated as LSS in FIG. 1B) and metadata, current media content schedule, and pre-encoded media asset schedule (indicated as PMAS in FIG. 1B) and metadata. The user selection service 158 may utilize attributes from scheduled next programming media content item, aggregate customer data/user preferences to determine a set of suitable options for the next programming media content from the set of available programming media content (for example live input streams and pre-encoded media assets). In accordance with an embodiment, the user selection service 158 may interact with the network scheduler 112A or directly with the programming schedule 111.

In operation, as a pre-requisite, the dynamic mixed mode publishing system 102 may be configured to generate a first disparate live output stream manifests in mixed mode based on switching between one or more live input stream manifests and one or more pre-encoded media asset manifests. The generation of the first disparate live output stream manifests in mixed mode for a consumer device, for example the consumer device 110*a*, may be based on one or more additional parameters and a programming schedule 111. The one or more additional parameters may comprise information pertaining to preferred media content, demographic data, geographic location of consumer, and rights associated with the one or more live input streams, or the one or more pre-encoded media assets. In accordance with an embodiment, the programming schedule 111 may be generated by the scheduler system 112 based on a preference of media content provided by a user associated with the consumer device 110*a* from recommendation provided by the stream selection service 142. In accordance with another embodiment, the programming schedule 111 may be generated by the scheduler system 112 based on an automatic selection of the media content based on previously gathered consumer data and user preferences.

A media player in the consumer device, for example the consumer device 110*a*, may be configured to access the existing first disparate live media output stream manifest that has been previously published and provisioned by the dynamic mixed mode publishing system 102. During streaming of the existing first disparate live media output stream on the media player, the user selection service 158 in the dynamic mixed mode publishing system 102 may be configured to determine a set of alternate live input streams and/or a set of alternate pre-encoded media assets. The user selection service 158 in the dynamic mixed mode publishing system 102 may be further configured to determine associated alternate live media output manifests and/or associated alternate pre-encoded media assets manifests, respectively, based on one or more parameters and metadata associated with the existing first disparate live media output stream.

In accordance with an embodiment, based on an indicator, such as an overlay indicator, in the existing first disparate live media output stream manifest associated with the existing first disparate live media output stream inserted by the stream publishing engine 114, alternate content options may be transmitted to the media player. The alternate content options comprise one or more options corresponding to the set of alternate live input streams and/or the set of alternate pre-encoded media assets.

The user selection service 158 may be configured to receive a response, such as a user selection, from the consumer device 110*a* corresponding to a selection of an alternate live input stream and/or an alternate pre-encoded media asset from the set of alternate live input streams or the set of alternate pre-encoded media assets, respectively. The user selection service 158 may be configured to communicate with the scheduler system 112 to update the programming schedule based on the user selection of the alternate live input stream and/or the alternate pre-encoded media asset. The indexing and storage system 116 may retrieve and index the selected alternate pre-encoded media assets from a media content master storage system in case the alternate pre-encoded media assets are not indexed. In an embodiment, the selected alternate live input stream and corresponding live input stream manifests may be encoded and packaged and stored in the content delivery system.

Based on the updated programming schedule and the user selection from the existing first disparate live media output stream, the stream publishing engine 114 may be configured to insert an alternate live input stream manifest associated with the selection of an alternate live input stream and/or the an alternate pre-encoded media asset manifest associated with the selection of alternate pre-encoded media asset into the existing first disparate live media output stream manifest associated with the existing first disparate live media output stream. Accordingly, the stream publishing engine 114 may be configured to publish an updated first disparate live media output stream manifest, which includes the selected alternate live input stream manifest and/or the selected alternate pre-encoded media asset manifest, to the content delivery system.

The consumer device 110*a* may access the Ad decisioning server 106*a*, for example, whenever the media player encounters one or more events, such as an ad break tag or an overlay tag. Alternatively, the consumer device 110*a* may access a proxy server and the proxy server may be configured to access the Ad decisioning server 106*a* for making the ad calls on behalf of the consumer device 110*a*. Upon receiving ad segments from the Ad decisioning server 106*a* or the proxy server, the consumer device 110*a* may be configured to replace the non-programming media content segments in the updated first disparate live media output stream with the ad segments returned from the Ad decisioning server 106 or the proxy server.

Figure 1B:
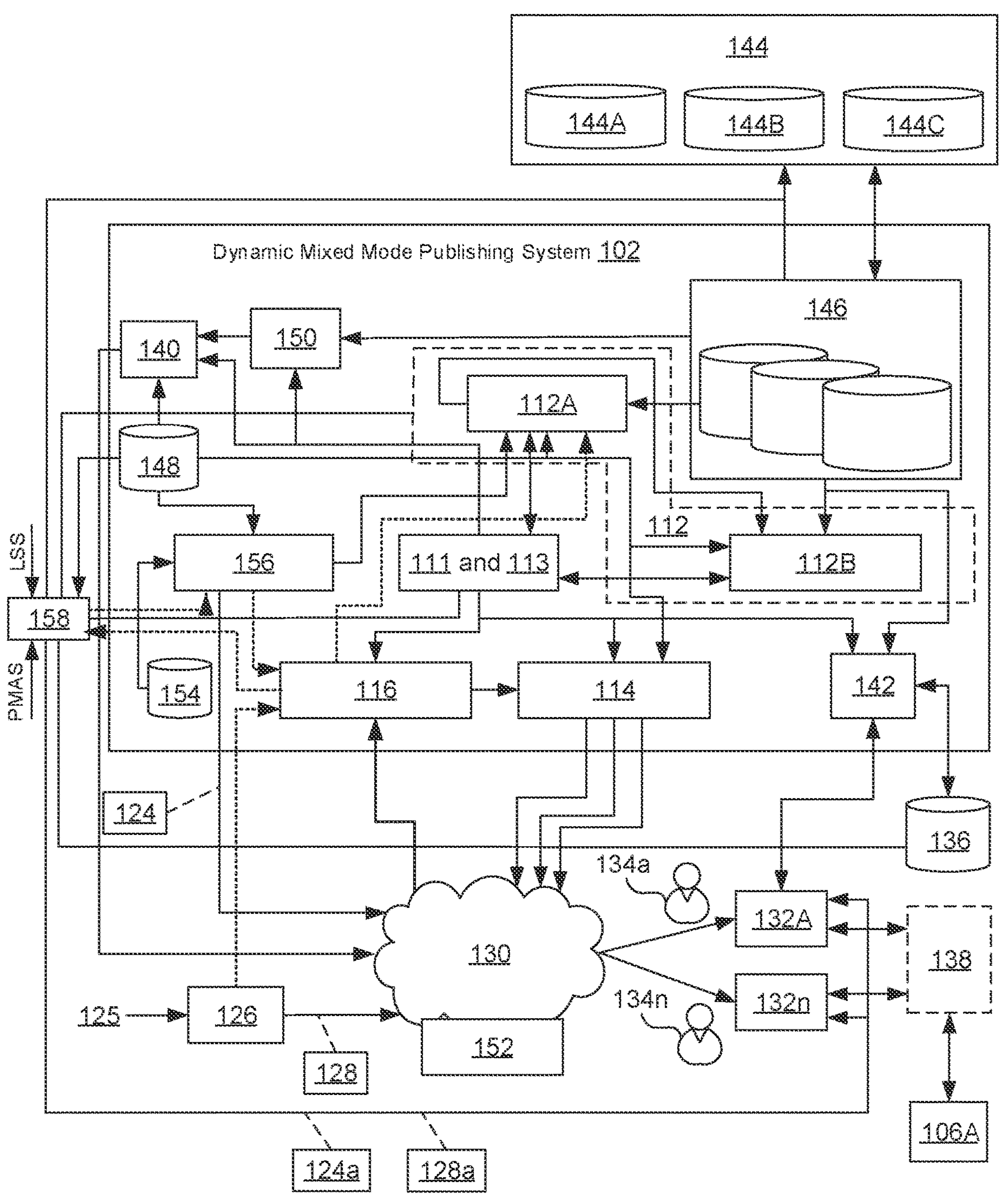
FIG. 1B is a block diagram that illustrates an exemplary dynamic mixed mode publishing system for publishing disparate live media output streams in mixed mode based on user selection, in accordance with an exemplary embodiment of the disclosure.

FIG. 1B is a block diagram that illustrates an exemplary dynamic mixed mode publishing system for publishing an updated disparate live media output stream in mixed mode based on user selection, in accordance with an exemplary embodiment of the disclosure. Referring to FIG. 1B, the dynamic mixed mode publishing system 102, in addition to the Ad decisioning server 106*a*, the scheduler system 112 (including the network scheduler 112A and the switch logic manager 112B), the stream publishing engine 114, the indexing and storage system 116, stream selection service 142, and the user selection service 158 and comprises additional components. The dynamic mixed mode publishing system 102 may further include the programming schedule 111, an updated programming schedule 113, a set of alternate pre-encoded media assets 124, an alternate pre-encoded media asset 124*a*, live feeds 125, live stream encoder/packager 126, set of alternate live input streams 128, and an alternate live input stream 128*a*. There are also shown a content delivery system 130, which is an example of the network 108, client devices 132*a*, . . . , 132*n*, which correspond to the plurality of consumer devices 110*a*, . . . , 110*n*, and users 134*a* and 134*n* associated with the client devices 132*a* and 132*n*. There are further shown a Geo location service 136, a proxy server 138, a program guide service 140, a stream selection service 142, a stream owner/operator 144 (further comprising a preferences database 144A, a requirement database 144B, and a consumer database 144C), a schedules, rights, and preferences database 146, a media content metadata storage system 148, an experience control system 150, a media storage 152, a media content master storage system 154, and a content encoder/packager 156.

In some embodiments of the disclosure, the scheduler system 112 (including the network scheduler 112A and the switch logic manager 112B and the programming schedule, 111), the stream publishing engine 114, the indexing and storage system 116, the program guide service 140, the stream selection service 142, the schedules, rights, and preferences database 146, the media content metadata storage system 148, the experience control system 150, the media content master storage system 154, the content encoder/packager 156, and the user selection service 158 may be integrated to form an integrated system. In some embodiments of the disclosure, as shown, the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media content master storage system 154, the content encoder/packager 156, and the user selection service 158 may be distinct. Other separation and/or combination of the various entities of the exemplary dynamic mixed mode publishing system 102 illustrated in FIG. 1B may be done without departing from the spirit and scope of the various embodiments of the disclosure.

The programming schedule 111 may correspond to an instruction set for an existing first disparate live media output stream. The programming schedule 111 may inform the stream publishing engine 114 about pre-encoded media assets and live input streams as well as when and how to switch between the various pre-encoded media assets and live input streams. The programming schedule 111 may also support defining break durations for mid roll ads, break locations, and durations in the pre-encoded media asset and live input stream switches.

The updated programming schedule 113 may correspond to an instruction set for an updated disparate live media output stream. The updated programming schedule 113 may inform the stream publishing engine 114 about the alternate pre-encoded media asset 124*a* and/or the alternate live input stream 128*a*. Specifically, the updated programming schedule 113 may indicate that when and how to switch between the various pre-encoded media assets and live input streams and the alternate pre-encoded media asset 124*a* and/or the alternate live input stream 128*a*. The updated programming schedule 113 may also support defining break durations for mid roll ads, break locations, and durations in the alternate pre-encoded media asset 124*a* and/or the alternate live input stream 128*a*.

The set of set of alternate pre-encoded media assets 124 may correspond to one or more pre-encoded media assets determined by the user selection service 158 in conjunction with the scheduler system 112. The determination may be based on one or more parameters and metadata. The one or more parameters may comprise metadata associated with the existing first disparate live media output stream, consumer data, geographical restrictions, content rights information, individual consumer preferences, and generalized consumer preferences for the existing first disparate live media output stream being streamed on the media player. The set of alternate pre-encoded media assets 124 may be included in the one or more options presented to the media player by the user selection service 158. Various media container formats of the set of alternate pre-encoded media assets 124 may include, but are not limited to, transport stream (TS), fragmented MP4 (fMP4), Common Media Application Format (CMAF) and the like. For each of such set of alternate pre-encoded media assets 124, there may exist a pre-encoded media asset schedule comprising metadata (such as time of start, duration and the like). The set of alternate pre-encoded media assets 124 may include the alternate pre-encoded media asset 124*a* selected by a user, for example the user 134*a* associated with the client device 132*a*.

The live feeds 125 may correspond to live content segments of one or more media feeds of channels, such as a live feed of a CNN channel. The media feed of a channel may correspond to a live broadcast feed or a live regional feed generated by source devices 118.

The live stream encoder/packager 126 may comprise suitable logic, circuitry, and interfaces that may be configured to execute code to receive the live feeds 125 from source devices 118. The live stream encoder/packager 126 may encode and package the live feeds 125 into the set of alternate live input streams 128, in specific formats ready for delivery to the client devices 132*a*, . . . , 132*n*. Each of the set of alternate live input streams 128 may comprise plurality of media segments transcoded to a different type of stream for different types of device, such as a TV or a mobile device, and marked with Nielson markers. The live stream encoder/packager 126 may be configured to generate a plurality of live input stream manifests corresponding to the each of the set of alternate live input streams 128. Various formats of the plurality of live input stream manifests or playlists, may include, but are not limited to DASH and HLS. Such live input streams and corresponding live input stream manifests may be transmitted to a content delivery system.

The set of alternate live input streams 128 may correspond to one or more live input streams determined by the user selection service 158 in conjunction with the scheduler system 112. The determination may be based on one or more parameters and metadata. The one or more parameters may comprise metadata associated with the existing first disparate live media output stream, consumer data, geographical restrictions, content rights information, individual consumer preferences, and generalized consumer preferences for the existing first disparate live media output stream being streamed on the media player. The set of alternate live input streams 128 may be included in the one or more options presented to the media player by the user selection service 158. Various media container formats of the set of alternate live input streams 128 may include, but are not limited to, TS, fMP4, CMAF and the like. For each of the set of alternate live input streams 128, there may exist a live schedule comprising metadata (such as time of start, duration and the like), stored in the live schedules database of the schedules, rights, and preferences database 146. The set of alternate live input streams 128 may include the alternate live input stream 128*a* selected by a user, for example the user 134*a* associated with the client device 132*a*.

The content delivery system 130 may correspond to the network 108, described in FIG. 1. The content delivery system 130 may comprise networks configured for distributing media content to the plurality of client devices 132*a*, . . . , 132*n*. Generally, the term "content," "metadata," "media," and similar words are used interchangeably to refer to any type of media—audio, videos, datacasts, music, text, images, graphics, articles, photos, photo galleries, video galleries, infographics, maps, polls, guest biographies, tweets or other social media, blog posts, and/or the like. The content delivery system 130 may be configured to provide a plurality of disparate live media output streams to the plurality of client devices 132*a*, . . . , 132*n*, via a transport stream, segmented streaming, progressive download, or any other modes of distributing a multimedia presentation, such as via an over-the-air content delivery/distribution network, a linear content delivery/distribution network, a cable content delivery/distribution network, a satellite content delivery/distribution network, an Internet Protocol (IP) based content delivery/distribution network, and/or the like.

The client devices 132*a*, . . . , 132*n* may correspond to consumer devices 110*a*, . . . , 110*n*. In accordance with an embodiment, the client devices 132*a*, . . . , 132*n* may be content recognition (CR)-enabled devices, such as automatic content recognition enabled devices. The client devices 132*a*, . . . , 132*n* may be configured to communicate with the Ad decisioning server 106*a* and/or the proxy server 138, via the content delivery system 130, or a separate communication network.

The users 134*a* and 134*n* associated with the client devices 132*a* and 132*n* may provide corresponding user selections to the user selection service 158 when the user selection service 158 presents one or more options on the client devices 132*a* and 132*n*.

The Geo location service 136 may comprise suitable logic, circuitry, and interfaces that may be configured to provide services to the stream selection service 142 for mapping an IP address of a client device to a geolocation. The Geo location service 136 may further test for usage of a virtual private network for enforcing regional blackouts on one or more client devices of the plurality of client devices 132*a*, . . . , 132*n* that do not support natively collecting and providing the geolocation.

The proxy server 138 may comprise suitable logic, circuitry, and interfaces that may be configured to execute code to communicate with the client devices 132*a*, . . . , 132*n*. In accordance with an embodiment, the proxy server 138 may receive requests from the client devices 132*a*, . . . , 132*n* when the client devices 132*a*, . . . , 132*n* generate requests for the Ad decisioning server 106*a* upon encountering, for example, an advertisement break tag or an overlay tag in the updated disparate live media output stream. In such cases, the proxy server 138 may generate requests to the Ad decisioning server 106*a* for the advertisements on behalf of the client devices 132*a*, . . . , 132*n*. In another embodiment, the proxy server 138 may receive the manifest form the content delivery system 130 and may deliver the manifest to the client devices 132*a*, . . . , 132*n* based on one or more client requests. The proxy server 138 may be configured to detect for example break indicators, and call the Ad decisioning server 106*a*, replace the filler media segments in the manifest and then deliver the modified manifest to the client devices 132*a*, . . . , 132*n*. In an embodiment, the proxy server 138 may be used for one or more client devices of the plurality of client devices 132*a*, . . . , 132*n* where the media player is fully controlled by a third party and does not support ad insertion. In such embodiment, ad blocking may be reduced which usually targets communication between the plurality of client devices 132*a*, . . . , 132*n* and the Ad decisioning server 106*a*. Further, the proxy server 138 may replace the pre-encoded placeholder content segments, such as slate content segments, with the advertisement content segments received from the Ad decisioning server 106*a*.

The program guide service 140 may comprise suitable logic, circuitry, and interfaces that may be configured to execute code to provide a time accurate listing of which programming content is currently playing on each of the generated channels and broadcast channels as well as if experiences, like program restart, are available for a program. In accordance with an embodiment, the client devices 132*a*, . . . , 132*n* may call the program guide service 140 to discover what media content is currently playing by the media player and what media content is coming up next. In accordance with an embodiment, the program guide service 140 may be provided with As-Run data for each generated live media output stream to correct any timing discrepancies between an original programming schedule and what is actually playing at a given time.

The stream selection service 142 may comprise suitable logic, circuitry, and interfaces that may be configured to provide a client device, for example, the client device 132*a*, requesting to view the existing first disparate live media output stream with a correct variant of disparate live media output stream, based on the geolocation and identification of the client device 132*a*, along with data retrieved from the schedules, rights, and preferences databases 146. The stream selection service 142 may further receive a user preferences of the user 134*a* associated with the client device 132*a*, for example, to view the recommended/desired existing first disparate live media output stream on the client device 132*a*. The stream selection service 142 may further store the received preferences in the schedules, rights, and preferences databases 146, and also communicates to the switch logic manager 112B and the stream publishing engine 114. The stream selection service 142 acts as an interface between the switch logic manager 112B of the dynamic mixed mode publishing system 102 and the plurality of client devices 132*a*, . . . , 132*n*.

The stream owner/operator 144 may comprise suitable logic, circuitry, and interfaces that may be configured to provide one or more additional parameters to the switch logic manager 112B regarding contractual content requirements for specific locations, and historical knowledge of location preferences. The stream owner/operator 144 may further provide data to the switch logic manager 112B about how to handle non-programming content breaks, whether to insert non-programming content between media switches, how the transition between events may be executed, whether a network logo needs to be displayed and if so how often. The stream owner/operator 144 may further provide data, such as consumer data (for example, billing Zip code), and special service level tiers. Additionally, the stream owner/operator 144 may further provide content parameters, for example, regarding the types of channels to be generated (theme, genre, title, and the like), the number of advertisement breaks per hour, and duration of such advertisement breaks.

The schedules, rights, and preferences database 146 may comprise suitable logic, circuitry, and interfaces that may be configured to execute code to store content rights, user preferences, regional preferences, live schedules, and regional rights. For example, content rights may store availability and platform rights for live input streams in the programming schedules, such as the programming schedule 111, the user preferences may store preferences of individual user viewing preferences, the regional preferences may store regional viewing preferences, the live schedules may store the schedules for live input streams, and the regional rights may store regional blackout zones for the various sports leagues, for example. The schedules, rights, and preferences database may further store data supplied from the stream owner/operator 144 including requirements, preferences, such as pre-defined location-based viewing preferences, stream transition rules, and any required client data, such as service level and zip code.

The media content metadata storage system 148 may comprise suitable logic, circuitry, and interfaces that may be configured to store media content metadata. The media content metadata may include metadata associated with media content segments of pre-encoded media assets stored in the media content master storage system 154. Examples of the media content metadata may include a media content identifier, a title of the media content, type of the media content (such as movie series (season episode number)), genre, plot summary, duration, advertisement break locations, credit locations, scene descriptions, a short summary of the media content segments, a short summary of ideal advertisement placements within the content, a file format, digital right management (DRM), encryption information, length of the media content, a date and/or time the media content was added to the catalog of media content, a new item indicator for the media content (e.g., a new media asset that became available within the last 24 hours, last few days, last week, and/or the like), a media content class, for example, a television show, a cartoon program, a movie, a news media, an episode, a game, a clip, a recorded sports event, interactive media, and/or the like. In general, the clip may be curated or editorially selected excerpts from existing full episodes, TV shows, or movies. In accordance with an exemplary embodiment, the media content metadata storage system 148 may also store program-specific information (PSI) data as defined by ISO/IEC 13818-1 (MPEG-2), closed captioning data, and subtitles associated with the media content segments stored in the media content master storage system 154. Other forms of metadata may be utilized without departing from the spirit and scope of the various embodiments of the disclosure.

The experience control system 150 may comprise suitable logic, circuitry, and interfaces that may be configured to execute code to implement a system that is based on content rights to allow individual client devices 132*a*, . . . , 132*n* to access the underlying pre-encoded media assets to enable services, such as restating a program from the beginning or moving forward in the programming schedule to a different programming content.

The media storage 152 may be configured to store encoded and packaged pre-encoded media assets (such as the set of alternate pre-encoded media assets 124), pre-encoded media asset manifests, live input streams (such as the set of alternate live input streams 128), and live input stream manifests for distribution.

The media content master storage system 154 may comprise suitable logic, circuitry, and interfaces that may be configured to store master versions of the media content. The master versions may be used as the source for creating the On-Demand or pre-encoded media assets for the plurality of client devices 132*a*, . . . , 132*n* in the required formats.

The content encoder/packager 156 may comprise suitable logic, circuitry, and interfaces that may be configured to execute code to determine a package that includes media content and associated metadata. The content encoder/packager 156 may be directly coupled to the indexing and storage system 116. Thus, the content encoder/packager 156 encodes and packages the media content into the required on-demand formats as the set of alternate pre-encoded media assets 124 for delivery to the client devices 132*a* and 132*n*. The media content may correspond to one or more of the plurality of media segments transcoded to different types of streams for different types of devices, such as a TV or a mobile device, and marked with Nielson markers. Based on such a package, a corresponding media content distribution device may dynamically generate one or more encoded media assets for playout to one or more players communicatively coupled through the content delivery system 130.

The content encoder/packager 156 may be configured to publish the one or more encoded media assets, such as the set of alternate pre-encoded media assets 124, in real-time or near real-time to the content delivery system 130. The content encoder/packager 156 may also be configured to provide near-real time redundancy. The resulting converted output, for example the set of alternate pre-encoded media assets 124, that is generated by the content encoder/packager 156 may be communicated to the indexing and storage system 116 which may be communicatively coupled with the plurality of client devices 132*a*, . . . , 132*n*. The content encoder/packager 156 may also support a robust interface (e.g. application data interface (ADI)) that defines the on-demand duration of the individual segments as well as encryption requirements and a service type to link for ad insertion.

In operation, as a pre-requisite, the stream publishing engine 114 may be configured to generate a first disparate live output stream manifests in mixed mode based on switching between one or more live input stream manifests and one or more pre-encoded media asset manifests. The generation of the first disparate live output stream manifests in mixed mode for a consumer device, for example the consumer device 110*a*, may be based on one or more additional parameters and the programming schedule 111. The one or more additional parameters may comprise information pertaining to preferred media content, demographic data, geographic location of consumer, and rights associated with the one or more live input streams, or the one or more pre-encoded media assets. In accordance with an embodiment, the programming schedule 111 may be generated by the scheduler system 112 based on a selection of media content provided by a user associated with the consumer device 110*a* from a recommendation provided by the stream selection service 142. In accordance with another embodiment, the programming schedule 111 may be generated by the scheduler system 112 based on an automatic selection of the media content based on previously gathered consumer data and user preferences.

The format of such first disparate live output stream manifest, live input stream manifests, and pre-encoded media asset manifests may correspond to, for example, DASH and HLS. Further, the media container format of the existing first disparate live media output stream, live input streams, and pre-encoded media assets may correspond to, for example, TS, fMP4, and CMAF. Such first disparate live output stream manifest may be received by a client device 132*a*, for example, to acquire the defined media content. In some embodiments, to provide additional personalization and scale, an intelligent client device may receive a higher-level instruction set from the dynamic mixed mode publishing system 102 and perform the manipulation to generate the existing first disparate live media output stream locally.

In accordance with an embodiment, the user selection service 158, in conjunction with the scheduler system 112, may be configured to determine the set of alternate live input streams 128 and/or the set of alternate pre-encoded media assets 124, and associated alternate live media output manifests and/or associated alternate pre-encoded media assets manifests, respectively, based on the one or more parameters and metadata associated with the existing first disparate live media output stream. Examples of the one or more parameters may include, but are not limited to, metadata associated with the existing first disparate live media output stream, consumer data, geographical restrictions, content rights information, individual consumer preferences, and generalized consumer preferences for the existing first disparate live media output stream being streamed on the media player of the client device 132*a*, for example.

The user selection service 158 may be further configured to determine whether the set of alternate live input streams 128 and/or the set of alternate pre-encoded media assets 124, and associated alternate live media output manifests and/or associated alternate pre-encoded media assets manifests, respectively, are already indexed. In not, the user selection service 158 may be further configured to access the indexing and storage system 116 and/or content encoder/packager 156 to index the set of alternate live input streams 128 and/or the set of alternate pre-encoded media assets 124, and associated alternate live media output manifests and/or associated alternate pre-encoded media assets manifests, respectively.

Based on the detection of an indicator in the existing first disparate live media output stream manifest inserted by the stream publishing engine 114, the user selection service 158 may be configured to transmit alternate content options to the media player of the client device 132*a*, for example. The alternate content options comprise one or more options corresponding to the set of alternate live input streams 128 and/or the set of alternate pre-encoded media assets 124.

In accordance with an embodiment, the user selection service 158 may be configured to receive the response, such as the user selection, corresponding to the selection of an alternate live input stream 128*a* and/or an alternate pre-encoded media asset 124*a* from the set of alternate live input streams 128 or the set of alternate pre-encoded media assets 124, respectively. The response may correspond to a voting response, a like or no-like response, or a feedback response. In accordance with an embodiment, the user selection service 158 may be configured to receive the response periodically or prior to an end of streaming of a current live input stream and/or a current pre-encoded media asset being streamed on the existing first disparate live media output stream.

The user selection service 158 may be further configured to determine a count of responses received for each of the selected alternate live input stream 128*a* and/or the selected alternate pre-encoded media asset 124*a*. In accordance with an embodiment, when the count of responses is zero, streaming of the existing first disparate live media output stream may continue. In accordance with other embodiments, the count of responses, received for each of the selected alternate live input stream 128*a* and the selected alternate pre-encoded media asset 124*a* are unequal or equal. Accordingly, the programming schedule 111 may be updated to include manifests associated with the selected alternate live input stream 128*a* and/or the selected alternate pre-encoded media asset 124*a*. The stream publishing engine 114 may be configured to insert the alternate live input stream manifest associated with the alternate live input stream 128*a* and/or the alternate pre-encoded media asset manifest associated with the alternate pre-encoded media asset 124*a* into the existing first disparate live media output stream manifest. The insertion may be based on the user selection of one of the options presented at the client device 132*a*, for example, as alternate content options on the existing first disparate live media output stream. In accordance with an embodiment, the stream publishing engine 114 may be configured to insert one or more events included in the alternate live input stream manifest and/or the alternate pre-encoded media asset manifest into the existing first disparate live media output stream manifest.

In accordance with an embodiment when the count is unequal, the stream publishing engine 114 may be configured to publish the updated first disparate live media output stream manifest to the content delivery system 130. The updated first disparate live media output stream manifest may include the selected alternate live input stream manifest or the selected alternate pre-encoded media asset manifest.

In accordance with another embodiment when the count is equal, the stream publishing engine 114 may be configured to publish two or more second disparate live media output stream manifest to the content delivery system 130. The two or more second disparate live media output stream manifests may include the corresponding selected alternate live input stream manifest and the selected alternate pre-encoded media asset manifest.

Figure 2:
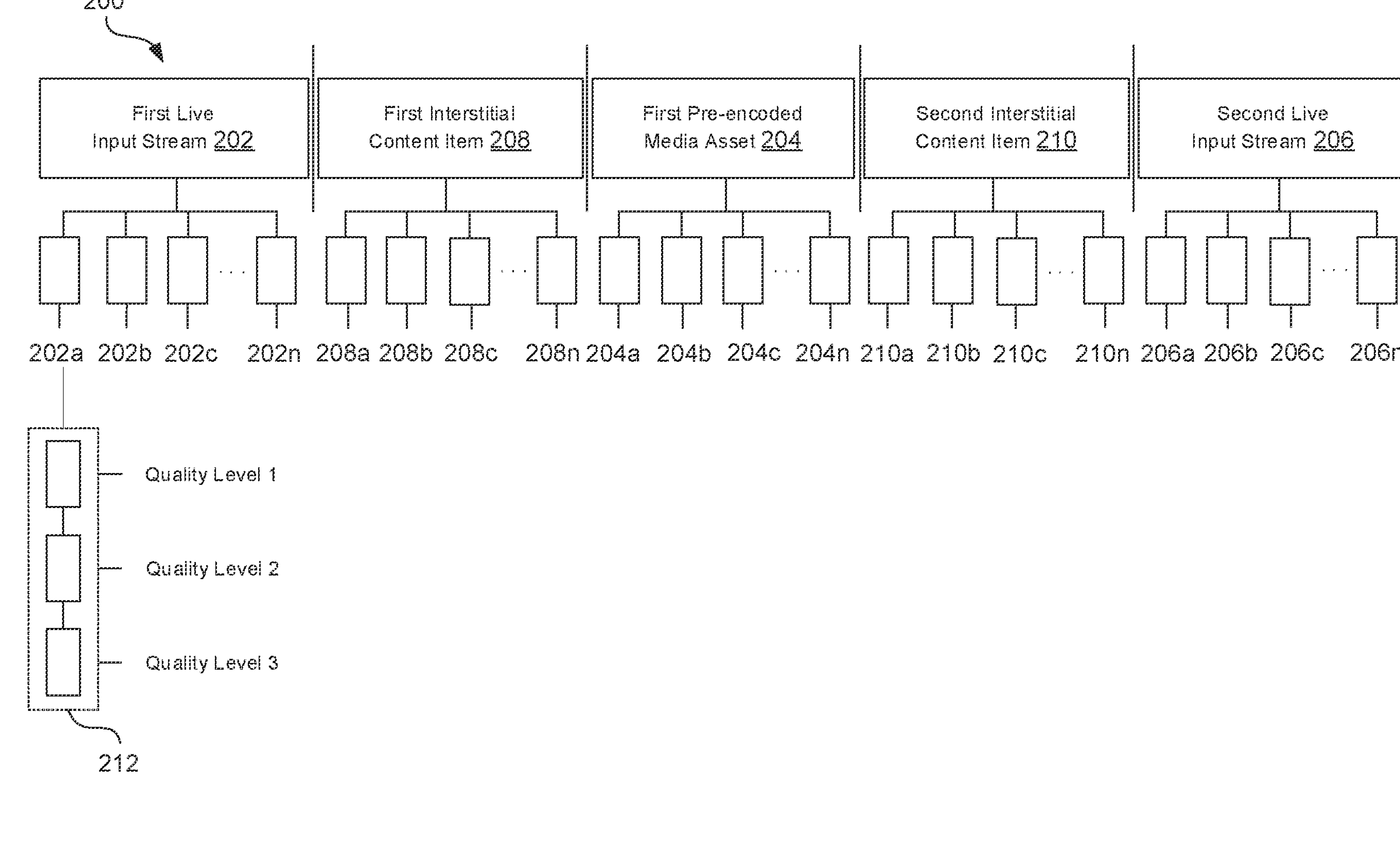
FIG. 2 illustrates segmentation of live input streams and pre-encoded media assets for a programming schedule for publishing disparate live media output streams in mixed mode based on user selection by the dynamic mixed mode publishing system of FIG. 1B, in accordance with an exemplary embodiment of the disclosure.

FIG. 2 illustrates segmentation of live input streams and pre-encoded media assets for the programming schedule 111 or the updated programming schedule 113 for publishing the existing first disparate live media output stream or the updated first disparate live media output stream in mixed mode based on user selection by the dynamic mixed mode publishing system 102 of FIG. 1B, in accordance with an exemplary embodiment of the disclosure. Referring to the exemplary arrangement of FIG. 2, there is shown a first live input stream 202, a first pre-encoded media asset 204, and a second live input stream 206. There is also shown a first interstitial content item 208 placed after the first live input stream 202, and a second interstitial content item 210 placed after the first pre-encoded media asset 204. The first pre-encoded media asset 204 may be a pre-encoded content item, and may be stored in the media content master storage system 154 in segments or other forms. For example, the first live input stream 202 may be segmented into first set of video segments 202*a*, 202*b*, 202*c*, . . . , 202*n*. Similarly, the first pre-encoded media asset 204 and the second live input stream 206 may also be segmented into second set of video segments 204*a*, 204*b*, 204*c*, . . . , 204*n*, and third set of video segments 206*a*, 206*b*, 206*c*, . . . , 206*n* respectively. By way of example, the segmentation of the first live input stream 202 and the second live input stream 206 may be executed by the live stream encoder/packager 126 Further, the segmentation of the first pre-encoded media asset 204 may be executed by the content encoder/packager 156. The encode stage may create various quality levels and the package stage segments the content into the short segments, and produces the correct format, such as TS, fMP4, or CMAF and encrypts the media content to prevent piracy. In accordance with an embodiment, the segments of the first set of video segments 202*a*, 202*b*, 202*c*, . . . , 202*n*, the second set of video segments 204*a*, 204*b*, 204*c*, . . . , 204*n*, and third set of video segments 206*a*, 206*b*, 206*c*, . . . , 206*n*, may be segmented into consistent length, for example, 10 seconds segments. It may be advantageous to have a consistent and smaller file size of segments to be able to quickly push to the content delivery system 130, and also for quick downloading by a media player at the end-user side, such as on the plurality of consumer devices 110*a*, . . . , 110*n*.

It is to be understood by those skilled in the art that various changes may be made and segments of different file sizes (or length) may be used without departure from the scope of the present disclosure. Further, it should be recognized by one skilled in the art that other streaming protocols may require a different processing of media content. Thus, the scope of the disclosure should not be limited to the processing or preparation of media content to allow delivery using different delivery methods, streaming protocols, or distribution system, known in the art. Further, instead of the live input streams and pre-encoded media asset arranged, as shown, different arrangements per the programming schedule 111 or the updated programming schedule 113 may be possible with respect to interstitial content items.

The insertion of the live content segments may be done on-the-fly based on dynamic scheduling and the programming schedule 111 or the updated programming schedule 113. The insertion of the live input streams, pre-stored media content, pre-encoded media assets, and/or the like, may be driven by real time or near-real time content context analysis, user-selection on the consumer devices 110*a*, . . . , 110*n*, or driven by external data received from the external data source 120. The scheduler system 112 in association with the stream selection service 142 may be configured to insert live input streams or pre-stored media assets, in an existing disparate live media output stream based on manipulation of a manifest the existing disparate live media output stream, such as an existing channel.

In accordance with an embodiment, each segment of the first set of video segments 202*a*, 202*b*, 202*c*, . . . , 202*n*, the second set of video segments 204*a*, 204*b*, 204*c*, . . . , 204*n*, and third set of video segments 206*a*, 206*b*, 206*c*, . . . , 206*n*, may be further processed to be stored at various quality levels, and content encryption modes for the purposes of adaptive bitrate streaming and Digital Rights Management, for example, the video segment 202*a* may be stored in a plurality of quality levels, for example, high definition (HD), high dynamic range (HDR) video, or different quality levels in accordance with specified pixel resolutions, bitrates, frame rates, and/or sample frequencies. As each of the media content, such as 202 to 206, are encoded, segmented, and stored in the plurality of quality levels in the media content master storage system 154. The media content may be re-used to create new channels, such as new disparate live media output streams, without having to re-encode a selected live input stream or a pre-encoded media asset when a new disparate live media output stream is created using the live input streams or a pre-encoded media asset.

For the sake of brevity, and with reference to FIG. 2, there is shown an example of publishing first and updated disparate live media output streams in mixed mode using certain protocols or streaming methods for at least one delivery method of the distribution system. It is to be understood that media packaging for different delivery methods (such as analog terrestrial broadcast, digital terrestrial broadcast, direct-to-home satellite broadcast, cable, other Internet Protocol (IP)-based delivery methods, over-the-top television (OTT)), different streaming protocols, or distribution system, may be different. The media content may be prepared to be viewed one or more of the plurality of consumer devices 110*a*, . . . , 110*n*, based on at least the desired delivery method, delivery conditions, content protection requirements, to satisfy operational and technical requirements, as needed. The operational and technical requirements may include, but are not limited to, media encoding, media segmentation, programming schedule (or manifest) creation or manipulation requirements, desired media encryption, and/or metadata signaling requirements. For example, in certain scenarios and for certain media content delivery methods, network bandwidth, network conditions, or device-type where media content is to be consumed may not be variable or known in advance. In such a case, creating different quality levels for same media content may not be required. Further, based on different operational and technical requirements, publishing of disparate live media output stream may be different. The media content that is prepared and distributed may include both the programming content, such as long-form presentations, short-form presentations, news or sporting events; and non-programming content, such as paid advertisements, public service advertisements, or promotional material.

Figure 3:
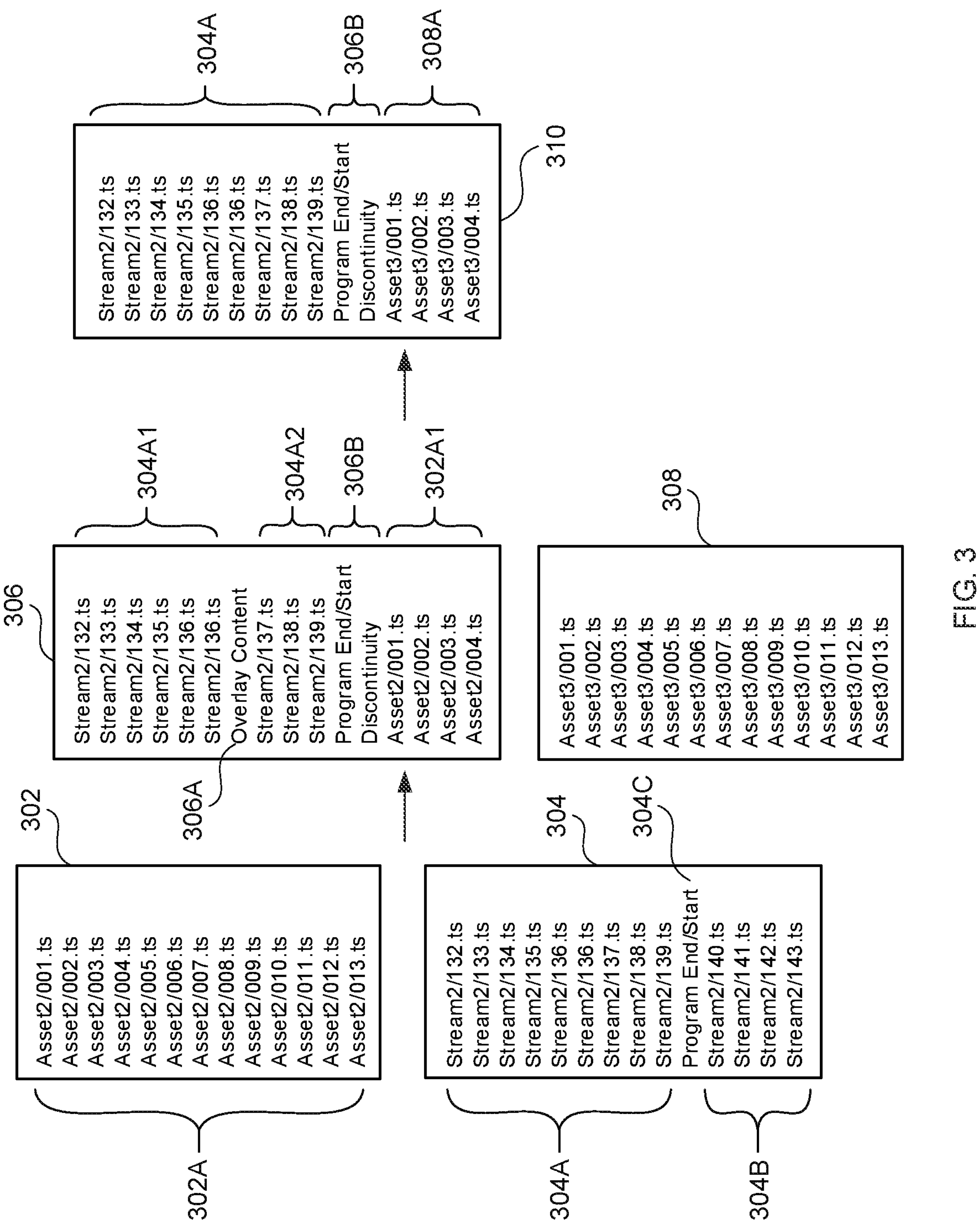
FIG. 3 illustrates a first exemplary scenario associated with publishing a disparate live media output stream in mixed mode using a live input stream and a pre-encoded media asset by the dynamic mixed mode publishing system of FIG. 1B, in accordance with an exemplary embodiment of the disclosure.

FIG. 3 illustrates a first exemplary scenario associated with publishing of the existing first disparate live media output stream and the updated first disparate live media output stream in mixed mode by the dynamic mixed mode publishing system 102 of FIG. 1B, in accordance with an exemplary embodiment of the disclosure. Referring to the exemplary scenario of FIG. 3, there are shown a first pre-encoded media asset manifest 302, a first live input stream manifest 304, an existing first disparate live media output stream manifest 306, an alternate pre-encoded media asset manifest 308, and an updated disparate live media output stream manifest 310.

The first pre-encoded media asset manifest 302 may be a pre-encoded On-Demand content item listed in the programming schedule 111. The first live input stream manifest 304 may also be encoded and packaged on-the-fly by the live stream encoder/packager 126 and listed in the programming schedule 111. The format of the first pre-encoded media asset manifest 302 and the first live input stream manifest 304 may be, for example, DASH, HLS, or other such format. Further, the format of a first pre-encoded media asset and a first live input stream corresponding to the first pre-encoded media asset manifest 302 and the first live input stream manifest 304, respectively, may be TS, fMP4, CMAF, or other such format.

The first pre-encoded media asset manifest 302 includes a plurality of first media segments. The first live input stream manifest 304 is shown includes a plurality of second media segments 304A and 304B and a programming content indicator, such as a program start/end tag 304C.

The stream publishing engine 114 may be configured to insert information related to the plurality of first media segments 302A. The stream publishing engine 114 may be further configured to insert information related to the plurality of second media segments 304A, and the programming content indicator, such as program start/end tag 304C, indicated in the first live input stream manifest 304. The stream publishing engine 114 may be configured to insert such information in the existing first disparate live media output stream manifest 306 at defined intervals. In accordance with the programming schedule 111, the stream publishing engine 114 may be configured to insert a first set of second media segments 304A1 followed by an indicator, such as alternate content options (for example overlay content) 306A, a second set of second media segments 304A2, additional information 306B, such as, program start/end tag and a discontinuity tag, followed by a first set of first media segments 302A1 in the existing first disparate live media output stream manifest 306.

When the integrated media player reads the alternate content options 306A from the disparate live media output stream manifest 306, one or more options may be presented to the user of the client device 132*a*. The one or more options may be presented to the user for receiving user selection to replace the next programming content, such as the first set of first media segments 302A1. The discontinuity tag in the additional information 306B may facilitate an integrated media player of the client device 132*a* to transition smoothly between media content from different sources, i.e. the first live input stream and the first pre-encoded media asset. Thereafter, the stream publishing engine 114 may publish the existing first disparate live media output stream manifest 306 in the content delivery system 130.

The client device, such as the client device 132*a*, receives the manipulated manifest, such as the existing first disparate live media output stream manifest 306, from the content delivery system 130, and the integrated media player may read information from the disparate live media output stream manifest 306 to acquire the defined media content. The channel that is streaming the existing first disparate live media output stream manifest 306 thus created may include a live input stream within which a pre-encoded media asset is inserted at a transition point of first media segments 302A1. For example, the user selects the alternate pre-encoded media asset manifest 308, and the user selection service 158 may update the programming schedule 111 to the updated programming schedule 113 to include the alternate pre-encoded media asset manifest 308 as the next programming content. Accordingly, the stream publishing engine 114 may be configured to insert the update the existing first disparate live media output stream manifest 306 to the updated disparate live media output stream manifest 310. The stream publishing engine 114 may insert a first set of third media segments 308A in the updated disparate live media output stream manifest 310 based on the updated programming schedule 113. The stream publishing engine 114 may then publish the updated disparate live media output stream manifest 310 in the content delivery system 130. Thus, the integrated media player may read information from the updated disparate live media output stream manifest 310, which is personalized based on the user selection, to acquire the desired programing media content.

Figure 4A:
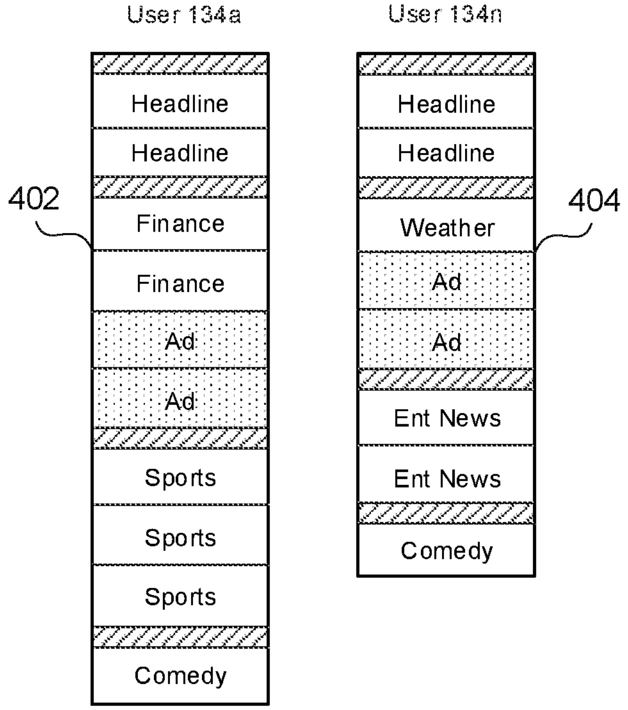
FIGS. 4A and 4B illustrate various second exemplary scenarios associated with playout of a disparate live media output stream, in accordance with an exemplary embodiment of the disclosure.
Figure 4B:
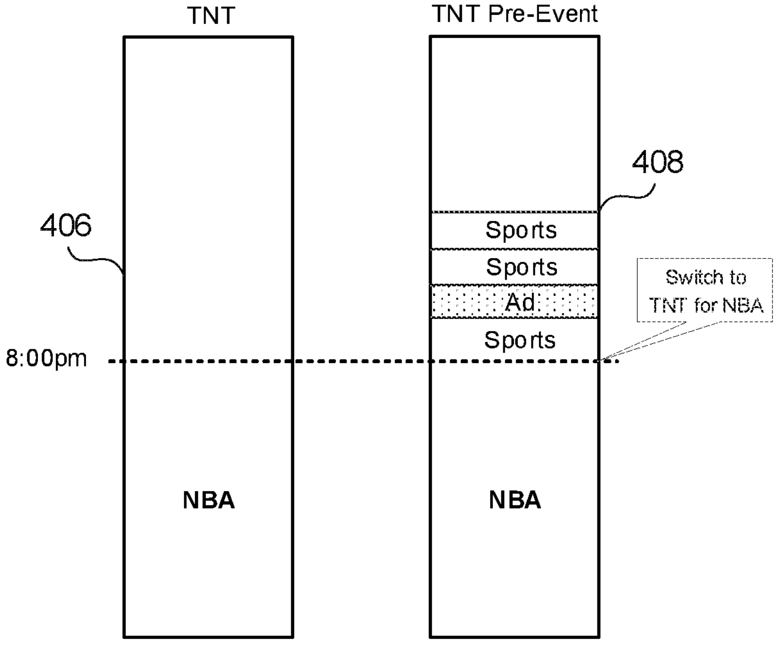

FIGS. 4A and 4B illustrate various second exemplary scenarios associated with playout of the updated disparate live media output stream published in FIG. 3, in accordance with an exemplary embodiment of the disclosure.

Referring to the exemplary scenario 400A, there are illustrated two updated disparate live media output streams 402 and 404 published for two users 134*a* and 134*n* associated with the client devices 132*a* and 132*n*, respectively. The two updated disparate live media output streams 402 and 404 are personalized disparate live media output streams in accordance with specific user selections provided by the two users 134*a* and 134*n*, respectively. In an exemplary embodiment, the alternate content options presented at the client devices 132*a* and 132*n* may be personalized based on the corresponding two users 134*a* and 134*n*, respectively. For example, their respective names may be displayed on the alternate content options further presenting one or more options for the two users 134*a* and 134*n*, respectively. The preferences of the user 134*a* include financial news, and sports news. Thus, the updated disparate live media output stream 402 includes financial news and sports news. On the other hand, the preferences of the user 134*n* include weather updates and Entertainment news. Thus, the updated disparate live media output stream 404 includes weather updates and Entertainment news.

Referring to the exemplary scenario 400B, there are illustrated an existing first disparate live media output streams 406 and an updated disparate live media output streams 408. The live NBA game may be scheduled to start at 8:00 pm. However, the user 134*a* associated with the client device 132*a* may tune in early to watch the NBA game, for example at 7:15 pm. However, the user 134*a* may not be interested in watching the end of the current media programming content. In such a case, the user 134*a* may send a query to the user selection service 158, in response to which the user selection service 158 provides one or more options as alternate content options to the user 134*a*. The user 134*a* may select NBA highlights and relevant non-programming media content between 7:15 pm and 8:00 pm. At 8:00 pm, the integrated media player switches to the live NBA game that the user 134*a* may watch. In an embodiment, the current clip is immediately cut-off and the switching may immediately perform. In another embodiment, the integrated media player may wait for the current clip to finish and then perform the switching, which may result in the live NBA game being slightly delayed.

Figure 5A:
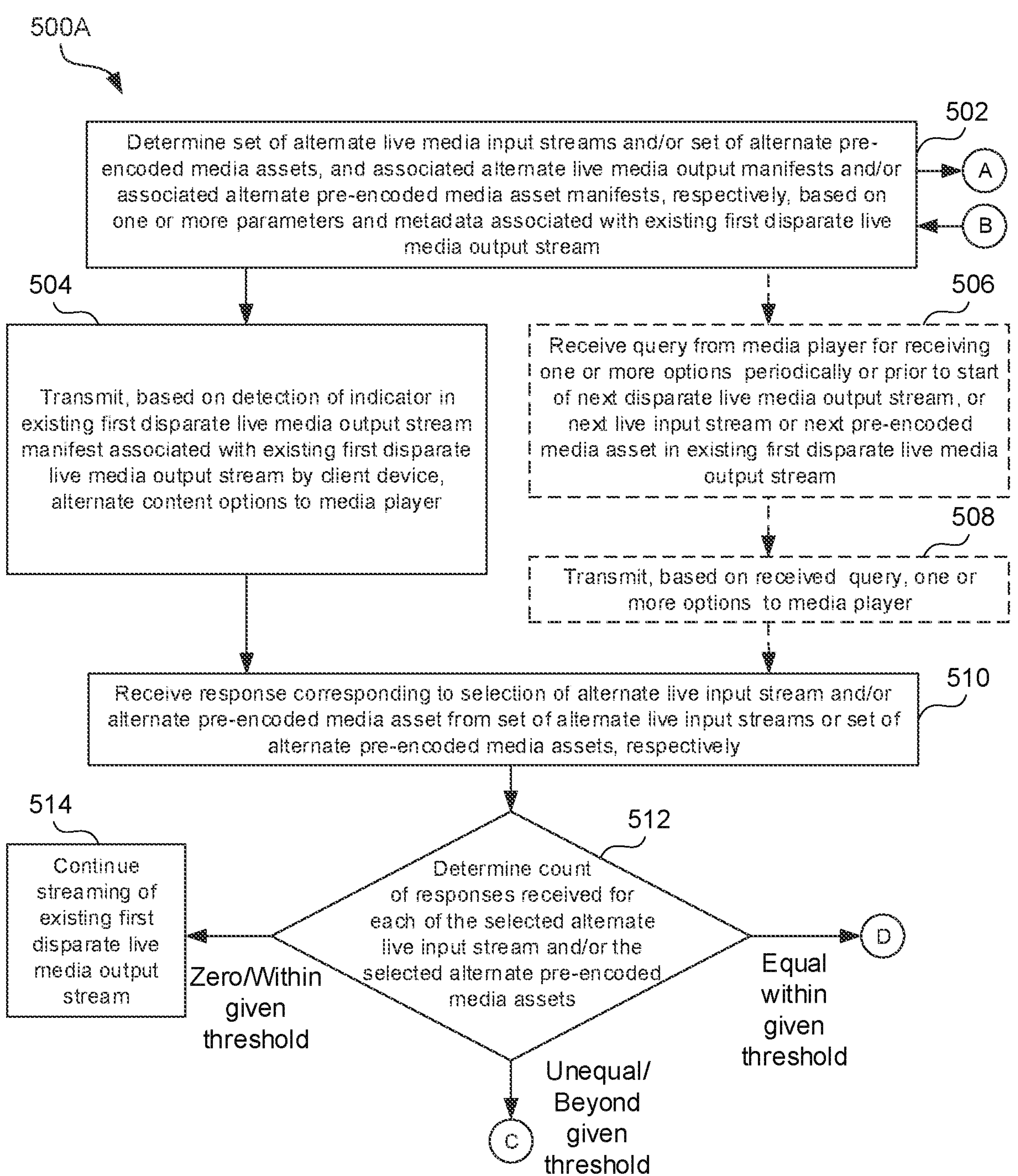
Figure 5B:
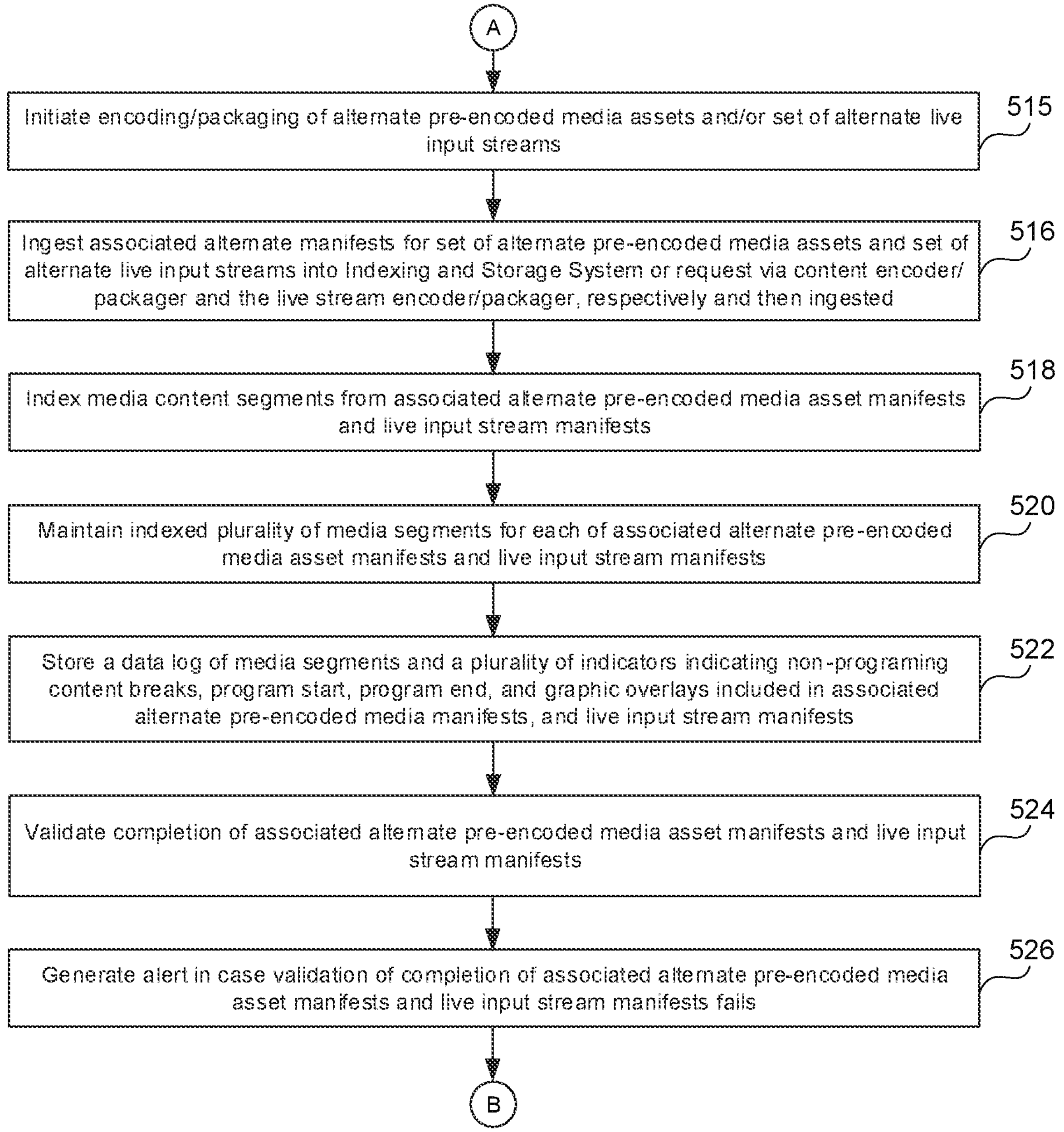

FIGS. 5A to 5C depict a flowchart illustrating exemplary operations for publishing disparate live media output streams in mixed mode based on user selection in the dynamic mixed mode publishing system 102 of FIG. 1B, in accordance with an exemplary embodiment of the disclosure. Referring to FIGS. 5A to 5C, there are shown flowcharts 500A to 500C comprising exemplary operations 502 through 514, 516 to 526, and 528 to 542 in flowcharts 500A, 500B and 500C, respectively.

As a pre-requisite to the exemplary operations, the dynamic mixed mode publishing system 102 may be configured to publish a first disparate live output stream manifests in mixed mode based on switching between one or more live input stream manifests and one or more pre-encoded media asset manifests. The published first disparate live output stream manifests in mixed mode for a client device, for example the client device 132*a*, may be based on one or more additional parameters and the programming schedule 111. The one or more additional parameters may comprise information pertaining to preferred media content, demographic data, geographic location of client device 132*a*, and rights associated with the one or more live input streams, or the one or more pre-encoded media assets. In accordance with an embodiment, the programming schedule 111 may be generated from the scheduler system 112 based on a selection of media content provided by a user associated with the client device 132*a* from a set options previously provided by the stream selection service 142. In accordance with another embodiment, the programming schedule 111 may be generated from the scheduler system 112 based on an automatic selection of the media content based on previously gathered consumer data and user preferences.

At 502, a set of alternate live input streams and/or a set of alternate pre-encoded media assets, and associated alternate live media output manifests and/or associated alternate pre-encoded media assets manifests, respectively, may be determined based on one or more parameters and metadata associated with the existing first disparate live media output stream. In accordance with an embodiment, the user selection service 158, in conjunction with the scheduler system 112, may be configured to determine and deliver the set of alternate live input streams 128 and/or the set of alternate pre-encoded media assets 124, and associated alternate live media output manifests and/or associated alternate pre-encoded media assets manifests, respectively, based on the one or more parameters and metadata associated with the existing first disparate live media output stream. Examples of the one or more parameters may include, but are not limited to, metadata associated with the existing first disparate live media output stream, consumer data, geographical restrictions, content rights information, individual consumer preferences, and generalized consumer preferences for the existing first disparate live media output stream being streamed on the media player of the client device 132*a*, for example. Examples of the one or more parameters may further include demographics data, trending data, content recognition, such as ACR-based data, preference based data, such as set "keywords", historical data, for example, viewing history or past user-selections, associated with one or more of the plurality of client devices 132*a*, . . . , 132*n*.

In accordance with an embodiment, the set of alternative pre-encoded media asset 124 may be provided by the content encoder/packager 156. The content encoder/packager 156 may be configured to encode and package media content and corresponding metadata received from the media content master storage system 154 and media content metadata storage system 148, respectively. Once the content encoder/packager 156 has generated the set of alternative pre-encoded media asset 124 for media distribution, the content encoder/packager 156 may be further configured to generate corresponding set of pre-encoded media asset manifests. The set of pre-encoded media asset manifests may correspond to data sets that may be utilized by the client device 132*a* to determine which media segments to play and storage locations of such media segments. The content encoder/packager 156 may be configured to provide encoded and packaged media content and corresponding metadata as the set of alternate pre-encoded media assets 124 and corresponding pre-encoded media asset manifest to the content delivery system 130 or directly to the indexing and storage system 116.

In accordance with an embodiment, the alternative live feeds 125 may be received by the live stream encoder/packager 126. The live stream encoder/packager 126 may be configured to encode and package the alternative live feeds 125 to generate a set of alternate live input streams 128 for media distribution. Once the live stream encoder/packager 126 has generated the set of alternate live input streams 128 for media distribution, the live stream encoder/packager 126 may be further configured to generate corresponding set of live input stream manifests. The live input stream manifests may correspond to data sets that may be utilized by the client device 132*a* to determine which media segments to play and storage locations of such media segments. The live stream encoder/packager 126 may be configured to provide encoded and packaged live feeds 125 as the alternative set of alternate live input streams 128 and corresponding live stream manifests to the content delivery system 130 or directly to the indexing and storage system 116. Various formats of the pre-encoded media asset manifests and live input stream manifests or playlists may include, but are not limited to DASH and HLS.

The user selection service 158 may be further configured to determine whether the set of alternate live input streams 128 and/or the set of alternate pre-encoded media assets 124, and associated alternate live media output manifests and/or associated alternate pre-encoded media assets manifests, respectively, are already indexed. If not, the user selection service 158 may be further configured to access the indexing and storage system 116 and/or content encoder/packager 156 to index the set of alternate live input streams 128 and/or the set of alternate pre-encoded media assets 124, and associated alternate live media output manifests and/or associated alternate pre-encoded media assets manifests, respectively. For indexing, control passes to exemplary operation 515 in FIG. 5B.

At 515, encoding/packaging of the set of alternate live input streams 128 and/or the set of alternate pre-encoded media assets 124 may be initiated. In accordance with an embodiment, the live stream encoder/packager 126 and/or the content encoder/packager 156 may be configured to initiate the encoding/packaging of the set of alternate live input streams 128 and/or the set of alternate pre-encoded media assets 124, respectively.

At 516, associated alternate manifests for the set of alternate pre-encoded media assets 124 and the set of alternate live input streams 128 may be ingested into the indexing and storage system 116 or requested via the content encoder/packager 156 and the live stream encoder/packager 126, respectively, and then ingested, as previously described. In accordance with an embodiment, the user selection service 158 may be configured to ingest the associated alternate live media output manifests and associated alternate pre-encoded media assets manifests, respectively, into the indexing and storage system 116. In accordance with an embodiment, a proprietary manifest format may be implemented between the content encoder/packager 156, the live stream encode/packager 126, and the indexing and storage system 116 in case additional information is required to be communicated to the indexing and storage system 116, which is not traditionally communicated in a published manifest.

At 518, media content segments from the associated alternate pre-encoded media asset manifests and live input stream manifests may be indexed. In accordance with an embodiment, the indexing and storage system 116 may be configured to index the plurality of media segments and indicators from the associated alternate pre-encoded media asset manifests and live input stream manifests. In accordance with an embodiment, the plurality of media segments may be generated based on encoding and packaging status of the set of alternate live input streams 128, ingestion status of the set of alternate live input streams 128, into the indexing and storage system 116, and availability of set of alternate live input streams 128 for immediate playout.

At 520, the indexed plurality of media segments for each of the associated alternate pre-encoded media asset manifests and live input stream manifests may be maintained for a defined duration. In accordance with an embodiment, the indexing and storage system 116 may be configured to maintain the indexed plurality of media segments for each of the associated alternate pre-encoded media asset manifests and live input stream manifests for a defined duration.

At 522, a data log of media segments and a plurality of indicators indicating non-programing content breaks, program start, program end, and graphic overlays included in the associated alternate pre-encoded media manifests, and live input stream manifests may be stored. In accordance with an embodiment, the indexing and storage system 116 may be configured to store a data log of media segments and plurality of indicators indicating non-programing content breaks, program start, program end, and graphic overlays included in the associated alternate pre-encoded media manifests, and live input stream manifests.

At 524, completion of the associated alternate pre-encoded media asset manifests and live input stream manifests may be validated. The associated alternate pre-encoded media asset manifests and live input stream manifests may be validated so that the associated alternate pre-encoded media asset manifests and live input stream manifests, may be included in an updated disparate live media output stream. In accordance with an embodiment, the indexing and storage system 116 may be configured to validate completion of the associated alternate pre-encoded media asset manifests and live input stream manifests, so that the associated alternate pre-encoded media asset manifests and live input stream manifests may be included in the disparate live media output stream.

At 526, an alert may be generated in case the validation of completion of the associated alternate pre-encoded media asset manifests and live input stream manifests fails. In accordance with an embodiment, the indexing and storage system 116 may be configured to generate alert in case the validation of the completion of the associated alternate pre-encoded media asset manifests and live input stream manifests fails. In such case, the indexing and storage system 116 may be configured to execute a corrective action before a scheduled switch time. Control returns to exemplary operation 502 in FIG. 5A. From exemplary operation 502, control may pass to exemplary operations 504 or 506, in accordance with two embodiments.

At 504, based on detection of indicator in the existing first disparate live media output stream manifest associated with existing first disparate live media output stream, alternate content options may be transmitted to the media player. In accordance with an embodiment, based on the detection of an indicator in the existing first disparate live media output stream manifest inserted by the stream publishing engine 114 or by the media player, the user selection service 158 may be configured to transmit alternate content options to the media player of the client device 132*a*, for example. The alternate content options may comprise one or more options corresponding to the set of alternate live input streams 128 and/or the set of alternate pre-encoded media assets 124. Control passes to exemplary operation 510.

At 506, a query from the media player against the existing first disparate live media output stream for providing one or more options periodically or prior to start of a next disparate live media output stream and/or a next pre-encoded media asset may be received. In accordance with an embodiment, the user selection service 158 may be configured to receive the query from, for example, the media player of the client device 132*a*. The query, against the existing first disparate live media output stream, may correspond to providing a list of options periodically or prior to start of a next disparate live media output stream and/or a next pre-encoded media asset. Control passes to exemplary operation 508.

At 508, based on received query, one or more options may be transmitted to the media player. In accordance with an embodiment, the user selection service 158 may be configured to transmit the one or more options to the media player of the client device 132*a*, for example, based on the received query. The one or more options may include the set of alternate live input streams 128 and/or the set of alternative pre-encoded media assets 124. The one or more options may be transmitted to the media player so that the one or more options may be presented to the user 134*a*, for example, associated with the client device 132*a*, for example. The one or more options may be presented to the user 134*a* at such a time that a user selection of an alternate live media input stream and/or a pre-encoded media asset may be inserted into the existing first disparate live media output stream without an interruption in the existing first disparate live media output stream. Control passes to exemplary operation 510.

At 510, response corresponding to a selection of an alternate live input stream and/or an alternate pre-encoded media asset from the set of alternate live input streams 128 or the set of alternate pre-encoded media assets 124, respectively. In accordance with an embodiment, the user selection service 158 may be configured to receive the response, such as the user selection, corresponding to the selection of an alternate live input stream 128*a* and/or an alternate pre-encoded media asset 124*a* from the set of alternate live input streams 128 or the set of alternate pre-encoded media assets 124, respectively. The response may correspond to a voting response, a like or no-like response, or a feedback response. In accordance with an embodiment, the user selection service 158 may be configured to receive the response periodically or prior to an end of streaming of a current live input stream and/or a current pre-encoded media asset being streamed on the existing first disparate live media output stream.

At 512, a count of responses received for each of the selected alternate live input stream and/or the selected alternate pre-encoded media asset may be determined. In accordance with an embodiment, the user selection service 158 may be configured to determine a count of responses received for each of the selected alternate live input stream 128*a* and/or the selected alternate pre-encoded media asset 124*a*. For example, forty percent of the total audience segment selected an alternate live input stream, for example, a live NBA game, another forty percent of the total audience segment selected an alternate pre-encoded media asset, for example, weird stories clips, and remaining twenty percent of the total audience segment selected another alternate pre-encoded media asset, for example a marathon show. In accordance with an embodiment, when the count of responses is zero or within a given minimum threshold, control passes to exemplary operation 514. At 514, streaming of the existing first disparate live media output stream may continue.

In accordance with an embodiment, when the count of responses, received for each of the selected alternate live input stream 128*a* and the selected alternate pre-encoded media assets 124*a* are unequal beyond a given threshold, control passes to exemplary operation 528 in FIG. 5C. In accordance with an embodiment, when the count of responses, received for each of the selected alternate live input stream 128*a* and the selected alternate pre-encoded media asset 124*a* are equal within given threshold, as described in the above example, control passes to exemplary operation 538 in FIG. 5C.

At 528, the programming schedule 111 may be updated to include manifests associated with the selected alternate live input stream 128*a* or the selected alternate pre-encoded media asset 124*a*. In accordance with an embodiment, the user selection service 158 may be configured to update the programming schedule 111 to the updated programming schedule 113 to include manifests associated with the selected alternate live input stream 128*a* or the selected alternate pre-encoded media asset 124*a*.

At 530, based on the user selection from the existing first disparate live media output stream, the alternate live input stream manifest associated with the alternate live input stream 128*a* or the alternate pre-encoded media asset manifest associated with the alternate pre-encoded media asset 124*a* may be inserted as next programming media content into the existing first disparate live media output stream manifest associated with existing first disparate live media output stream. In accordance with an embodiment, the stream publishing engine 114 may be configured to insert the alternate live input stream manifest associated with the alternate live input stream 128*a* or the alternate pre-encoded media asset manifest associated with the alternate pre-encoded media asset 124*a* into the existing first disparate live media output stream manifest. The insertion may be based on the user selection of one of the options presented at the client device 132*a*, for example, as overlay content on the existing first disparate live media output stream.

At 532, one or more events included in the alternate live input stream manifest and/or the alternate pre-encoded media asset manifest may be inserted into the existing first disparate live media output stream manifest associated with the existing first disparate live media output stream. In accordance with an embodiment, the stream publishing engine 114 may be configured to insert one or more events included in the alternate live input stream manifest or the alternate pre-encoded media asset manifest into the existing first disparate live media output stream manifest. Examples of the one or more events may include, but are not limited to, a programming content indicator, such as program start/end tag, a non-programming content indicator, such as an ad break point or a trigger, or an overlay indicator, such as an overlay tag.

At 534, an updated first disparate live media output stream manifest, which includes the selected alternate live input stream manifest and/or the selected alternate pre-encoded media asset manifest, may be published to the content delivery system 130. In accordance with an embodiment, the stream publishing engine 114 may be configured to publish the updated first disparate live media output stream manifest, which includes the selected alternate live input stream manifest or the selected alternate pre-encoded media asset manifest, to the content delivery system 130.

Referring back to exemplary operation 510, when the count of responses, received for each of the selected alternate live input stream 128*a* and the selected alternate pre-encoded media asset 124*a* are equal within given threshold, control passes to exemplary operation 538.

At 536, the programming schedule 111 may be updated to include manifests associated with the selected alternate live input stream 128*a* and the selected alternate pre-encoded media asset 124*a* corresponding to multiple audience segments with same count within given threshold of user selections. In accordance with an embodiment, the user selection service 158 may be configured to update the programming schedule 111 to the updated programming schedule 113 to include manifests associated with the selected alternate live input stream 128*a* and the selected alternate pre-encoded media asset 124*a*. Both the selected alternate live input stream 128*a* and the selected alternate pre-encoded media asset 124*a* may be included in the updated programming schedule 113 as the two audience segments associated with the two distinct selections for the alternate live input stream 128*a* and the alternate pre-encoded media asset 124*a* are with the same count, for example forty percent each of the total audience segment.

At 538, based on at least two distinct user selections on the existing first disparate live media output stream, corresponding alternate live input stream manifest associated with the selection of the alternate live input stream 128*a* and the alternate pre-encoded media asset manifest associated with the alternate pre-encoded media asset 124*a* may be inserted as respective next programming content into two branched second disparate live media output stream manifests. The at least two branched second disparate live media output stream manifests may be associated with the existing first disparate live media output stream. In accordance with an embodiment, the stream publishing engine 114 may be configured to insert corresponding alternate live input stream manifest associated with the selection of the alternate live input stream 128*a* and the alternate pre-encoded media asset manifest associated with the alternate pre-encoded media asset 124*a* as respective next programming content into the at least two branched second disparate live media output stream manifests. The at least two branched second disparate live media output stream manifests may be associated with the existing first disparate live media output stream.

At 540, one or more events included in corresponding alternate live input stream manifest and alternate pre-encoded media asset manifest may be inserted into respective at least two branched second disparate live media output stream manifests associated with the existing first disparate live media output stream. In accordance with an embodiment, the stream publishing engine 114 may be configured to insert one or more events included in corresponding alternate live input stream manifest and alternate pre-encoded media asset manifest into respective at least two branched second disparate live media output stream manifests. The at least two branched second disparate live media output stream manifests may be associated with the existing first disparate live media output stream.

At 542, the at least two or more branched second disparate live media output stream manifests, each including corresponding selected alternate live input stream manifest and selected alternate pre-encoded media asset manifest, may be published to the content delivery system 130. In accordance with an embodiment, the stream publishing engine 114 may be configured to publish the at least two or more branched second disparate live media output stream manifests, each including corresponding selected alternate live input stream manifest and selected alternate pre-encoded media asset manifest, to the content delivery system 130.

In accordance with an embodiment, the updated disparate live media output stream manifest (in accordance with exemplary operation 534) published to the content delivery system 130 may be played out by the integrated media player of the client device 132*a*. In accordance with another embodiment, the at least two branched second disparate live media output stream manifests (in accordance with exemplary operation 534) published to the content delivery system 130 may be played out by the integrated media players of the client devices 132*a* and 132*n*, for example.

In such embodiments, the existing first disparate live media output stream manifest may be transitioned to the selected alternate live input stream manifest corresponding to the selected alternate live input stream and/or the selected alternate pre-encoded media asset manifest corresponding to the selected alternate pre-encoded asset. The transition may be performed in accordance with a transition indicator in the existing first disparate live media output stream manifest. In accordance with an embodiment, the transition to the alternate live input stream manifest and/or the alternate pre-encoded media asset manifest, may be in accordance with one of: a first transition from the current live input stream to the selected alternate pre-encoded media asset, a second transition from the current live input stream to the selected alternate live input stream, a third transition from the current pre-encoded media asset to the selected alternate pre-encoded media asset, and a fourth transition from the current pre-encoded media asset to the selected alternate live input stream.

Figure 6:
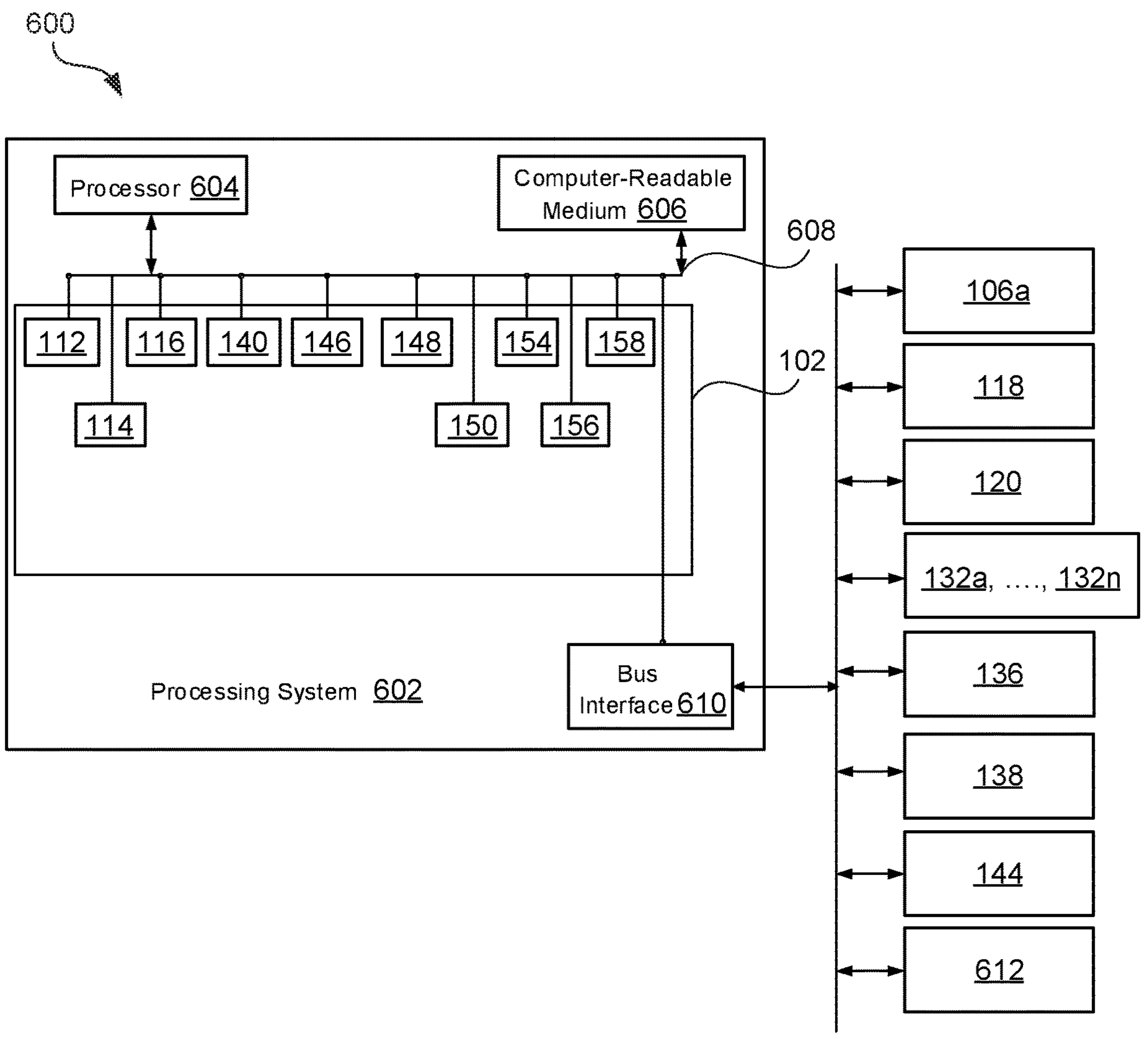
FIG. 6 is a conceptual diagram illustrating an example of a hardware implementation for a dynamic mixed mode publishing system employing a processing system for publishing disparate live media output streams in mixed mode based on user selection, in accordance with an exemplary embodiment of the disclosure.

FIG. 6 is a conceptual diagram illustrating an example of a hardware implementation for a dynamic mixed mode publishing system 102 employing a processing system for publishing an updated disparate live media output stream in mixed mode based on user selection, in accordance with an exemplary embodiment of the disclosure. Referring to FIG. 6, the hardware implementation shown by a representation 600 for the dynamic mixed mode publishing system 102 employs a processing system 602 for publishing an updated disparate live media output stream using the set of alternate pre-encoded media assets 124 and the set of alternate live input streams 128 in mixed mode based on the user selection, in accordance with an exemplary embodiment of the disclosure, as described herein.

In some examples, the processing system 602 may comprise one or more hardware processors 604, a non-transitory computer-readable medium 606, a bus 608, a bus interface 610, and a transceiver 612. FIG. 6 further illustrates the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media content master storage system 154, the content encoder/packager 156, and the user selection service 158, as described in detail in FIGS. 1A and 1B. FIG. 6 further illustrates the Ad decisioning server 106*a*, the client devices 132*a*, . . . , 132*n*, the Geo location service 136, the proxy server 138, the stream owner/operator 144, and the media storage 152 as described in detail in FIGS. 1A and 1B.

The hardware processor 604 may be configured to manage the bus 608 and general processing, including the execution of a set of instructions stored on the non-transitory computer-readable medium 606. The set of instructions, when executed by the processor 604, causes the dynamic mixed mode publishing system 102 to execute the various functions described herein for any particular apparatus. The hardware processor 604 may be implemented, based on a number of processor technologies known in the art. Examples of the hardware processor 604 may be a Reduced Instruction Set Computing (RISC) processor, an Application-Specific Integrated Circuit (ASIC) processor, a Complex Instruction Set Computing (CISC) processor, and/or other processors or control circuits.

The non-transitory computer-readable medium 606 may be used for storing data that is manipulated by the processor 604 when executing the set of instructions. The data is stored for short periods or in the presence of power. The non-transitory computer-readable medium 606 may also be configured to store data for one or more of the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, the content encoder/packager 156, and the user selection service 158.

The bus 608 is configured to link together various circuits. In this example, the dynamic mixed mode publishing system 102 employing the processing system 602 and the non-transitory computer-readable medium 606 may be implemented with bus architecture, represented generally by bus 608. The bus 608 may include any number of interconnecting buses and bridges depending on the specific implementation of the dynamic mixed mode publishing system 102 and the overall design constraints. The bus interface 610 may be configured to provide an interface between the bus 608 and other circuits, such as, transceiver 612, and external devices, such as source device 118, external data source 120, and client devices 132*a*, . . . , 132*n*.

The transceiver 612 may be configured to provide a communication of the dynamic mixed mode publishing system 102 with various other apparatus, such as the Ad decisioning servers 106*a*, . . . , 106*n*, the consumer devices 110*a*, . . . , 110*n*, such as the client devices 132*a*, . . . , 132*n*, the external data source 120, and the source device 118, via the network 108. The transceiver 612 may communicate via wireless communication with networks, such as the Internet, the Intranet and/or a wireless network, such as a cellular telephone network, a wireless local area network (WLAN) and/or a metropolitan area network (MAN). The wireless communication may use any of a plurality of communication standards, protocols and technologies, such as Global System for Mobile Communications (GSM), Enhanced Data GSM Environment (EDGE), Long Term Evolution (LTE), wideband code division multiple access (W-CDMA), code division multiple access (CDMA), time division multiple access (TDMA), Bluetooth, Wireless Fidelity (Wi-Fi) (such as IEEE 802.11a, IEEE 802.11b, IEEE 802.11g and/or IEEE 802.11n), voice over Internet Protocol (VoIP), and/or Wi-MAX.

It should be recognized that, in some embodiments of the disclosure, one or more components of FIG. 6 may include software whose corresponding code may be executed by at least one processor, for across multiple processing environments. For example, the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, the content encoder/packager 156, and the user selection service 158 may include software that may be executed across a single or multiple processing environments.

In an aspect of the disclosure, the processor 604, the non-transitory computer-readable medium 606, or a combination of both may be configured or otherwise specially programmed to execute the operations or functionality of the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, the content encoder/packager 156, and the user selection service 158, or various other components described herein, as described with respect to FIGS. 1A to 5C.

Various embodiments of the disclosure comprise the dynamic mixed mode publishing system 102 that may be configured to publish disparate live media output streams to be viewed on a plurality of consumer devices (such as the consumer devices 110*a*, . . . , 110*n*) based on user selection. The dynamic mixed mode publishing system 102 may comprise, for example, the scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, the content encoder/packager 156, and the user selection service 158. In accordance with an embodiment, when a current media programming content in the existing first disparate live media output stream is streamed on a media player, one or more processors in the user selection service 158 may be configured to determine a set of alternate live input streams 128 and/or a set of alternate pre-encoded media assets 124. The one or more processors in the user selection service 158 may be further configured to determine associated alternate live media output manifests and/or associated alternate pre-encoded media assets manifests. Such determination may be based on one or more parameters and metadata associated with the existing first disparate live media output stream. The one or more parameters may comprise metadata associated with the existing first disparate live media output stream, consumer data, geographical restrictions, content rights information, individual consumer preferences, and generalized consumer preferences for the existing first disparate live media output stream streamed on the media player.

The one or more processors in the user selection service 158 may be further configured to transmit, based on an indicator in the existing first disparate live media output stream manifest associated with the existing first disparate live media output stream, alternate content options to the media player. The alternate content options may comprise one or more options corresponding to the set of alternate live input streams 128 and/or the set of alternate pre-encoded media assets 124. The one or more processors in the user selection service 158 may be further configured to receive a response corresponding to a selection of an alternate live input stream 128*a* and/or an alternate pre-encoded media asset 124*a* from the set of alternate live input streams 128 or the set of alternate pre-encoded media assets 124, respectively. The response may correspond to a voting response, like or no-like response, or a feedback response.

The one or more processors in the stream publishing engine 114 may be configured to insert, based on the selection from the existing first disparate live media output stream, an alternate live input stream manifest associated with the selection of an alternate live input stream 128*a* and/or the an alternate pre-encoded media asset manifest associated with the selection of alternate pre-encoded media asset 124*a*, as a next programming media content, into the existing first disparate live media output stream manifest associated with the existing first disparate live media output stream.

In accordance with an embodiment, the one or more processors in the stream publishing engine 114 may be further configured to publish an updated first disparate live media output stream manifest, which includes the selected alternate live input stream manifest and/or the selected alternate pre-encoded media asset manifest, to the content delivery system 130. The existing first disparate live media output stream may be scheduled based on the programming schedule 111, and the updated first disparate live media output stream may be scheduled based on the updated programming schedule 113. The updated programming schedule 113 may be based on the received response corresponding to the selection of the alternate live input stream 128*a* or the alternate pre-encoded media asset 124*a* from the set of alternate live input streams 128 or the set of alternate pre-encoded media assets 124, respectively. The updated programming schedule 113 may schedule the selected alternate live input stream 128*a* or the alternate pre-encoded media asset 124*a* as next programming media content after the current media programming content.

In accordance with an embodiment, the one or more processors in the stream publishing engine 114 may be further configured to insert one or more events included in the alternate live input stream manifest and/or the alternate pre-encoded media asset manifest in the first disparate live media output stream manifest associated with the existing first disparate live media output stream. The one or more events may correspond to at least a programming content indicator, a non-programming content indicator, or the indicator in the existing first disparate live media output stream manifest, the alternate live input stream manifest, and/or the alternate pre-encoded media asset manifest.

In accordance with an embodiment, the existing first disparate live media output stream manifest may be transitioned to the selected alternate live input stream manifest corresponding to the selected alternate live input stream 128*a* and/or the selected alternate pre-encoded media asset manifest corresponding to the selected alternate pre-encoded media asset 124*a* in accordance with a transition indicator in the existing first disparate live media output stream manifest. The transition from the existing first disparate live media output stream to the alternate live input stream manifest and/or the alternate pre-encoded media asset manifest, may be in accordance with one of: a first transition from the current live input stream to the selected alternate pre-encoded media asset 124*a*, a second transition from the current live input stream to the selected alternate live input stream 128*a*, a third transition from the current pre-encoded media asset to the selected alternate pre-encoded media asset 124*a*, and a fourth transition from the current pre-encoded media asset to the selected alternate live input stream 128*a*.

In accordance with an embodiment, the one or more processors in the user selection service 158 may be further configured to receive a query from the media player against the existing first disparate live media output stream to provide one or more options periodically or prior to start of a next disparate live media output stream and/or a next pre-encoded media asset. The one or more processors in the user selection service 158 may be further configured to receive the response corresponding to the selection of the alternate live input stream 128*a* and/or the alternate pre-encoded media asset 124*a* periodically or prior to an end of a current live input stream and/or a current pre-encoded media asset streamed on the existing first disparate live media output stream.

In accordance with an embodiment, the one or more processors in the user selection service 158 may be further configured to determine a count of responses received for each of the set of alternate live input streams 128 and/or the set of alternate pre-encoded media assets 124. The one or more processors in the user selection service 158 may be further configured to determine whether the count of responses received for two or more of the set of alternate live input streams 128 and/or the set of alternate pre-encoded media assets 124 are same. Accordingly, the one or more processors in the stream publishing engine 114 may be further configured to insert two or more alternate live input stream manifests and/or alternate pre-encoded media asset manifests associated with the two or more of the set of alternate live input streams 128 and/or the set of alternate pre-encoded media assets 124, respectively, as next programming media content into two or more second disparate live media output stream manifests associated with two or more second disparate live media output stream for two or more client devices 132*a* and 132*n*, for example. In an instance in which the response is not received, the one or more processors are configured to continue to stream the existing first disparate live media output stream.

Various embodiments of the disclosure may provide a computer-readable medium, such as the non-transitory computer-readable medium 606, having stored thereon, computer implemented instruction that when executed by the processor 604 causes the dynamic mixed mode publishing system 102 to execute operations to publish disparate live output stream manifests in mixed mode based on user selection. In accordance with an embodiment, when a current media programming content in an existing first disparate live media output stream is streamed on a media player, one or more processors in the user selection service 158 may be configured to determine a set of alternate live input streams 128 and/or a set of alternate pre-encoded media assets 124. The processor 604 further causes the dynamic mixed mode publishing system 102 to execute operations to determine associated alternate live media output manifests and/or associated alternate pre-encoded media assets manifests. Such determination may be based on one or more parameters and metadata associated with the existing first disparate live media output stream. The processor 604 further causes the dynamic mixed mode publishing system 102 to execute operations to transmit, based on an indicator in an existing first disparate live media output stream manifest associated with the existing first disparate live media output stream, alternate content options to the media player. The processor 604 further causes the dynamic mixed mode publishing system 102 to execute operations to receive a response corresponding to a selection of an alternate live input stream 128*a* and/or an alternate pre-encoded media asset 124*a* from the set of alternate live input streams 128 or the set of alternate pre-encoded media assets 124, respectively. The processor 604 further causes the dynamic mixed mode publishing system 102 to execute operations to insert, based on the selection from the existing first disparate live media output stream, an alternate live input stream manifest associated with the selection of an alternate live input stream 128*a* and/or the an alternate pre-encoded media asset manifest associated with the selection of alternate pre-encoded media asset 124*a*, as a next programming media content, into the existing first disparate live media output stream manifest associated with the existing first disparate live media output stream.

Currently, with many broadcast entertainment networks, programming schedules create transition points for different audience segments. For example, at a first channel, programming may transition from a crime drama, such as Major Crimes, to an NBA game. The NBA game appeals to a completely different audience segment than the one watching Major Crimes. The audience turnover at these transition points creates a desire to be able to branch the network to maximize retention of the existing audience segment while simultaneously acquiring a new audience segment to watch the NBA game. There is also a requirement for personalization of disparate live media output streams based on user selections. Further, dedicated encoders, such as physical encoders, are used to encode each program stream before distribution or transmission (for example, before a distribution of a program stream of a channel). Such dedicated encoders are not only costly but also limit the ability of a broadcast provider to swap or change content dynamically in a program stream as each content item needs to pass through such dedicated encoders for transmission. In this regard, if any new content item is to be inserted in the program stream of channel for distribution, that program stream will have to be re-encoded again. This in turn increases re-work and requires installation of large infrastructures and resources to maintain uninterrupted content delivery for existing channel and limits the ability of the broadcast or network provider to change content in real time or near-real time. There is further requirement to insert a live stream into a live stream created using a VOD2Live system. For example, the ability to switch a live breaking news stream into CNN Headlines live channel consisting of a collection of recent news clips.

To address the above problems, in accordance with the various embodiments of the present disclosure, the dynamic mixed mode publishing system 102 may be configured to analyze audience turnover at transition points created by the programming schedule 111 for different audience segments. The users in the audience segments are enabled to provide user selections based on which the next programming media content in the updated disparate live media output stream is inserted. Thus, the disparate live media output stream may be personalized or customized based on the user selections indicating user preferences for the next programming media content. In case there the count of user selections of at least two programming media content are same, the dynamic mixed mode publishing system 102 may generate at least two branched disparate live media output streams corresponding to different user selections of different audience segments. Such branching may maximize retention of the existing audience segment while simultaneously acquiring a new audience segment to watch a specific program, such as the NBA game. Thus, the dynamic mixed mode publishing system 102 provides enhanced, intelligent, and personalized viewer experience with increased appeal in order to retain and gain a wider audience. Such branching of disparate live media output streams may provide an option to users, not interested in a live event, to watch the desired programming media content.

Further, the dynamic mixed mode publishing system 102 may be configured to dynamically schedule and manipulate manifest of a live input streams and pre-encoded media assets. Programming and non-programming content in the existing live input streams and pre-encoded media assets streamed on a channel are inserted into an updated disparate live media output stream manifest to be directly delivered over a distribution system (such as one or more delivery methods) to be viewed on one or more consumer devices 110*a*, . . . , 110*n*. The disparate live media output stream in which the alternate media item is inserted may not be required to pass through the dedicated encoders before delivery over the network 108, such as the content delivery system 130.

The scheduler system 112 (including the network scheduler 112A and the switch logic manager 112B), the stream publishing engine 114, the indexing and storage system 116, the program guide service 140, the stream selection service 142, the schedules, rights, and preferences database 146, the media content metadata storage system 148, the experience control system 150, the media storage 152, the media content master storage system 154, the content encoder/packager 156, and the user selection service 158 in conjunction with each other, provide significant productivity and efficiency improvements since the process of generating disparate live media output streams for numerous consumer devices has been simplified as the generated disparate live media output streams are independent of a requirement to re-process, that is re-encode and re-package, various live input streams for media distribution to the plurality of consumer devices in real time or near-real time. Thus, the network provider now may provide live channel offerings in a cost-effective manner.

Various components, as described above in FIG. 1B, enable the dynamic mixed mode publishing system 102 to leverage the modern streaming protocols, based on which the dynamic mixed mode publishing system 102 generates disparate live media output streams of the live broadcast channels around the audience transition points, for example. The disparate live media output streams may be generated based on insertion of live input streams into a generated disparate live media output stream using pre-encoded media assets. In this regard, manifests from the live input streams may be manipulated and produced for distribution of with the pre-encoded media assets.

As the media content itself does not need to be processed beyond the initial creation of the live input streams and pre-encoded media assets prepared for distribution, it is extremely inexpensive to provide branched disparate live media output streams. It may be based solely on the cost to manipulate the manifests, which provide the instructions for the media players in the client devices 132*a*, . . . , 132*n* to execute. The dynamic mixed mode publishing system 102 may also support targeted ad insertion on a per client basis through the insertion of ad tags in the generated disparate live media output stream manifest and may further leverage the processing power of the individual client devices 132*a*, . . . , 132*n* to insert targeted channel graphics and overlay advertisements and promotions.

As utilized herein the terms "circuits" and "circuitry" refer to physical electronic components (for example, hardware) and any software and/or firmware ("code") which may configure the hardware, be executed by the hardware, and/or otherwise be associated with the hardware. As used herein, for example, a particular processor and memory may comprise a first "circuit" when executing first one or more lines of code and may comprise a second "circuit" when executing second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and/or code (if any is necessary) to perform the function, regardless of whether performance of the function is disabled, or not enabled, by some user-configurable setting.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any non-transitory form of computer readable storage medium having stored therein a corresponding set of computer instructions that upon execution would cause an associated processor to perform the functionality described herein. Thus, the various aspects of the disclosure may be embodied in a number of different forms, which have been contemplated to be within the scope of the claimed subject matter. In addition, for each of the embodiments described herein, the corresponding form of any such embodiments may be described herein as, for example, "logic configured to" perform the described action.

Another embodiment of the disclosure may provide a non-transitory machine and/or computer readable storage and/or media, having stored thereon, a machine code and/or a computer program having at least one code section executable by a machine and/or a computer, thereby causing the machine and/or computer to perform the steps as described herein for publishing disparate live media output streams in mixed mode based on user selection.

The present disclosure may also be embedded in a computer program product, which comprises all the features enabling the implementation of the methods described herein, and which when loaded in a computer system is able to carry out these methods. Computer program in the present context means any expression, in any language, code or notation, either statically or dynamically defined, of a set of instructions intended to cause a system having an information processing capability to perform a particular function either directly or after either or both of the following: a) conversion to another language, code or notation; b) reproduction in a different material form.

Further, those of skill in the art will appreciate that the various illustrative logical blocks, modules, circuits, algorithms, and/or steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the embodiments disclosed herein may be embodied directly in firmware, hardware, in a software module executed by a processor, or in a combination thereof. A software module may reside in RAM memory, flash memory, ROM memory, EPROM memory, EEPROM memory, registers, hard disk, physical and/or virtual disk, a removable disk, a CD-ROM, virtualized system or device such as a virtual servers or container, or any other form of storage medium known in the art. An exemplary storage medium is communicatively coupled to the processor (including logic/code executing in the processor) such that the processor can read information from, and write information to, the storage medium. In the alternative, the storage medium may be integral to the processor.

While the present disclosure has been described with reference to certain embodiments, it will be noted understood by, for example, those skilled in the art that various changes and modifications could be made and equivalents may be substituted without departing from the scope of the present disclosure as defined, for example, in the appended claims. In addition, many modifications may be made to adapt a particular situation or material to the teachings of the present disclosure without departing from its scope. The functions, steps and/or actions of the method claims in accordance with the embodiments of the disclosure described herein need not be performed in any particular order. Furthermore, although elements of the disclosure may be described or claimed in the singular, the plural is contemplated unless limitation to the singular is explicitly stated. Therefore, it is intended that the present disclosure not be limited to the particular embodiment disclosed, but that the present disclosure will include all embodiments falling within the scope of the appended claims.

What is claimed is:

1. A system comprising memory and one or more processors communicatively coupled to the memory, the one or more processors configured to:

determine an alternative content option from one or more alternative content options for an existing disparate live media output stream that is streamed on a media player;

insert an alternative content manifest corresponding to the alternative content option to a branched version of a disparate live media output stream manifest corresponding to the existing disparate live media output stream to generate an updated disparate live media output stream manifest for a branched disparate live media output stream, wherein:

(a) the disparate live media output stream manifest comprises a current media programming content manifest that corresponds to a current media programming content of the existing disparate live media output stream, and (b) the alternative content manifest is separated from the current media programming content manifest within the updated disparate live media output stream manifest by a discontinuity tag to transition the media player from a first source corresponding to the current media programming content to a second source corresponding to the alternative content option; and publish the disparate live media output stream manifest and the updated disparate live media output stream manifest to a content delivery system, wherein the content delivery system streams the alternative content option to the media player based on the updated disparate live media output stream manifest.

2. The system of claim 1, wherein the alternative content option is identified from the one or more alternative content options based on user input.

3. The system of claim 2, wherein the user input comprises a plurality of voting responses from a plurality of users.

4. The system of claim 2, wherein the user input corresponds to a selection of the alternative content option from the one or more alternative content options.

5. The system of claim 4, wherein the one or more alternative content options are provided for display as an overlay to the existing disparate live media output stream.

6. The system of claim 1, wherein the one or more alternative content options are based on one or more parameters and metadata associated with the existing disparate live media output stream.

7. The system of claim 6, wherein the metadata comprises one or more of consumer data, one or more geographical restrictions, one or more content rights information, one or more individual consumer preferences, or one or more generalized consumer preferences for the existing disparate live media output stream.

8. The system of claim 7, wherein the alternative content option is automatically selected from the one or more alternative content options based on the one or more individual consumer preferences.

9. The system of claim 1, wherein:

(i) the existing disparate live media output stream is scheduled based on a programming schedule, (ii) the updated disparate live media output stream manifest is scheduled based on an updated programming schedule, and (iii) the updated programming schedule schedules the alternative content option after the current media programming content in the existing disparate live media output stream.

10. The system of claim 9, wherein the alternative content option comprises a live input stream or a pre-encoded media asset.

11. A method comprising:

determining, by one or more processors, an alternative content option from one or more alternative content options for an existing disparate live media output stream that is streamed on a media player;

inserting, by the one or more processors, alternative content manifest corresponding to the alternative content option to a branched version of a disparate live media output stream manifest corresponding to the existing disparate live media output stream to generate an updated disparate live media output stream manifest for a branched disparate live media output stream, wherein:

(a) the disparate live media output stream manifest comprises a current media programming content manifest that corresponds to a current media programming content of the existing disparate live media output stream, and (b) the alternative content manifest is separated from the current media programming content manifest within the updated disparate live media output stream manifest by a discontinuity tag to transition the media player from a first source corresponding to the current media programming content to a second source corresponding to the alternative content option; and publishing, by the one or more processors, the disparate live media output stream manifest and the updated disparate live media output stream manifest to a content delivery system, wherein the content delivery system streams the alternative content option to the media player based on the updated disparate live media output stream manifest.

12. The method of claim 11, wherein the alternative content option is identified from the one or more alternative content options based on user input.

13. The method of claim 12, wherein the user input comprises a plurality of voting responses from a plurality of users.

14. The method of claim 12, wherein the user input corresponds to a selection of the alternative content option from the one or more alternative content options.

15. The method of claim 14, wherein the one or more alternative content options are provided for display as an overlay to the existing disparate live media output stream.

16. The method of claim 11, wherein the one or more alternative content options are based on one or more parameters and metadata associated with the existing disparate live media output stream.

17. The method of claim 16, wherein the metadata comprises one or more of consumer data, one or more geographical restrictions, one or more content rights information, one or more individual consumer preferences, or one or more generalized consumer preferences for the existing disparate live media output stream.

18. The method of claim 17, wherein the alternative content option is automatically selected from the one or more alternative content options based on the one or more individual consumer preferences.

19. The method of claim 11, wherein:

(i) the existing disparate live media output stream is scheduled based on a programming schedule, (ii) the updated disparate live media output stream manifest is scheduled based on an updated programming schedule, and (iii) the updated programming schedule schedules the alternative content option after the current media programming content in the existing disparate live media output stream.

20. A non-transitory computer-readable medium having stored thereon, computer implemented instructions, that when executed by one or more processors in a computing system, cause the computing system to execute operations, the operations comprising:

determining an alternative content option from one or more alternative content options for an existing disparate live media output stream that is streamed on a media player;

inserting an alternative content manifest corresponding to the alternative content option to a branched version of a disparate live media output stream manifest corresponding to the existing disparate live media output stream to generate an updated disparate live media output stream manifest for a branched disparate live media output stream, wherein:

(a) the disparate live media output stream manifest comprises a current media programming content manifest that corresponds to a current media programming content of the existing disparate live media output stream, and (b) the alternative content manifest is separated from the current media programming content manifest within the updated disparate live media output stream manifest by a discontinuity tag to transition the media player from a first source corresponding to the current media programming content to a second source corresponding to the alternative content option; and publishing the disparate live media output stream manifest and the updated disparate live media output stream manifest to a content delivery system, wherein the content delivery system streams the alternative content option to the media player based on the updated disparate live media output stream manifest.

* * * * *